(12) United States Patent
Vermani et al.

(10) Patent No.: US 12,177,154 B2
(45) Date of Patent: Dec. 24, 2024

(54) ENHANCED SOUNDING PACKET DESIGNS

(71) Applicant: QUALCOMM Incorporated, San Diego, CA (US)

(72) Inventors: Sameer Vermani, San Diego, CA (US); Alfred Asterjadhi, San Diego, CA (US); Yanjun Sun, San Diego, CA (US); Bin Tian, San Diego, CA (US); Lin Yang, San Diego, CA (US); Jialing Li Chen, San Diego, CA (US); George Cherian, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/388,344

(22) Filed: Jul. 29, 2021

(65) Prior Publication Data
US 2022/0038241 A1 Feb. 3, 2022

Related U.S. Application Data

(60) Provisional application No. 63/059,149, filed on Jul. 30, 2020.

(51) Int. Cl.
*H04L 5/00* (2006.01)
(52) U.S. Cl.
CPC ................ *H04L 5/0053* (2013.01)
(58) Field of Classification Search
CPC ... H04L 5/0053; H04L 5/0055; H04L 5/0094; H04L 5/0048; H04L 5/001; H04L 5/0044
See application file for complete search history.

(56) References Cited

U.S. PATENT DOCUMENTS

2012/0140753 A1 6/2012 Lee et al.
2017/0303154 A1 10/2017 Merlin et al.
(Continued)

FOREIGN PATENT DOCUMENTS

WO  WO-2012093794 A2 * 7/2012 ........... H04B 7/0478
WO  WO-2016069729 A9 * 5/2017 ......... H04L 27/2613

OTHER PUBLICATIONS

International Search Report and Written Opinion—PCT/US2021/043867—ISA/EPO—dated Nov. 16, 2021.
Taiwan Search Report—TW110128086—TIPO—Oct. 1, 2024.

*Primary Examiner* — Walli Z Butt
*Assistant Examiner* — Thad D Defanuw
(74) *Attorney, Agent, or Firm* — Arun Swain

(57) ABSTRACT

This disclosure provides methods, devices and systems for generating enhanced sounding packets. Some implementations more specifically relate to sounding packet designs that support enhancements to wireless communication protocols associated with the Institute of Electrical and Electronics Engineers (IEEE) 802.11be amendment, and future generations, of the IEEE 802.11 standard. In some implementations, an enhanced null data packet announcement (NDPA) frame may be configurable to support multiple versions of the IEEE 802.11 standard. For example, the enhanced NDPA frame may be configured in accordance with a legacy or a non-legacy NDPA frame format. In some other implementations, the enhanced NDPA frame may include a subfield carrying information identifying a particular basic service set (BSS) which may be associated with one or more STA information fields. Still further, in some implementations, an Extremely High Throughput (EHT) PPDU may include signaling to indicate whether the EHT PPDU is formatted as a sounding NDP.

24 Claims, 20 Drawing Sheets

(56) References Cited

U.S. PATENT DOCUMENTS

| | | | |
|---|---|---|---|
| 2019/0261369 A1 | 8/2019 | Verma et al. | |
| 2020/0132857 A1 | 4/2020 | Berger et al. | |
| 2021/0250215 A1* | 8/2021 | Lim | H04L 27/26136 |
| 2021/0329547 A1* | 10/2021 | Kim | H04W 52/0216 |
| 2021/0336752 A1* | 10/2021 | Kwon | H04L 5/0055 |
| 2023/0283421 A1* | 9/2023 | Lim | H04L 5/0091 |
| | | | 370/338 |

* cited by examiner

*Figure 9*

ENHANCED SOUNDING PACKET DESIGNS

CROSS-REFERENCE TO RELATED APPLICATIONS

This patent application claims priority to U.S. Provisional Patent Application No. 63/059,149 entitled "ENHANCED SOUNDING PACKET DESIGNS" and filed on Jul. 30, 2020, which is assigned to the assignee hereof. The disclosures of all prior applications are considered part of and are incorporated by reference in this patent application.

TECHNICAL FIELD

This disclosure relates generally to wireless communication, and more specifically to enhanced packet designs for channel sounding.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Channel sounding is a technique for measuring the channel conditions of a shared wireless communication medium between a transmitting (TX) device and a receiving (RX) device. Existing versions of the IEEE 802.11 standard define a channel sounding procedure based on the transmission of null data packets (NDPs). The TX device may initiate a channel sounding operation by transmitting an NDP announcement (NDPA) frame, followed by an NDP, to the RX device. The RX device estimates the channel conditions based on the received NDP and transmits a feedback message, including information about the channel conditions, back to the TX device. The TX device may use the information about the channel condition to adjust or configure subsequent communications (such as for link adaptation or beamforming) with the RX device.

New WLAN communication protocols are being developed to enable enhanced WLAN communication features such as, for example, increases in bandwidth and number of spatial streams. As new WLAN communication protocols enable enhanced features, new sounding packet designs are needed to support channel sounding over greater bandwidths and numbers of spatial streams.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving a null data packet announcement (NDPA) frame indicating a request for sounding feedback, where the NDPA frame includes a medium access control (MAC) header, a sounding dialog token field that follows the MAC header, and a first wireless station (STA) information field carrying bandwidth information indicating a bandwidth associated with the sounding feedback, where the first two bits of the sounding dialogue token field indicate a format of the NDPA frame and the remaining bits of the sounding dialogue token field indicate a sounding dialog token number associated with the NDPA frame, and where the bandwidth information is associated with the format of the NDPA frame; receiving a null data packet (NDP) following the reception of the NDPA; and transmitting the sounding feedback based on the received NDP and the bandwidth information.

In some aspects, each of the first two bits of the sounding dialogue token field may have a value equal to 1. In some implementations, the bandwidth information may be carried in a partial bandwidth information subfield that is less than 14 bits in length. In some implementations, the first STA information field may include one or more reserved bits. In some implementations, the first STA information field may include a number of columns (Nc) subfield that is 4 bits in length. In some implementations, the Nc subfield may indicate a number of spatial streams or a number of columns of a feedback matrix to be included in the sounding feedback. In some implementations, the first STA information field may include an association identifier (AID) subfield having a special AID value that is not assigned to any STAs associated with the same basic service set (BSS) as the wireless communication device. In some implementations, the first STA information field may further include a partial BSS identifier (BSSID) subfield having a value associated with the BSS and a number of STA information fields (NumSTAInfoFields) subfield indicating a number (N) of STA information fields following the first STA information field, where each of the N STA information fields is identified based on a respective AID value and the value indicated by the partial BSSID subfield.

In some aspects, the NDP may be a physical layer convergence protocol (PLCP) protocol data unit (PPDU) having a physical layer preamble that includes a legacy signal field (L-SIG), a repeat of L-SIG (RL-SIG) that follows L-SIG, and a universal signal field (U-SIG) that follows RL-SIG and carries information indicating that the PPDU is an NDP. In some implementations, the information carried in U-SIG may include compression mode information indicating a compression mode associated with a multi-user (MU) PPDU format. In some implementations, the physical layer preamble may further include a non-legacy signal field (EHT-SIG) that follows U-SIG, where EHT-SIG includes a common field and zero user fields. In some implementations, the information carried in U-SIG may include a value of an EHT-SIG modulation and coding scheme (MCS) field indicating an MCS associated with EHT-SIG and may include a value of a number of EHT-SIG symbols field indicating a number of symbols associated with EHT-SIG. In some implementations, the value of the EHT-SIG MCS field may indicate MCS0 and the value of the number of EHT-SIG symbols field may indicate 1 EHT-SIG symbol.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including receiving an NDPA frame indicating a request for sounding feedback, where the NDPA frame includes a MAC header, a sounding dialog token field that follows the MAC header, and a first STA information field carrying bandwidth information indicating a bandwidth associated with the sounding feedback, where the first two bits of the sounding dialogue token field indicate a format of the NDPA frame and the remaining bits of the sounding dialogue token field indicate a sounding dialog token number associated with the NDPA frame, and where the bandwidth information is associated with the format of the NDPA frame; receiving an NDP following the reception of the NDPA; and transmitting the sounding feedback based on the received NDP and the bandwidth information.

Another innovative aspect of the subject matter described in this disclosure can be implemented as a method of wireless communication. The method may be performed by a wireless communication device, and may include transmitting an NDPA frame indicating a request for sounding feedback, where the NDPA frame includes a MAC header, a sounding dialog token field that follows the MAC header, and a first STA information field carrying bandwidth information indicating a bandwidth associated with the sounding feedback, where the first two bits of the sounding dialogue token field indicate a format of the NDPA frame and the remaining bits of the sounding dialogue token field indicate a sounding dialog token number associated with the NDPA frame, and where the bandwidth information is associated with the format of the NDPA frame; transmitting an NDP following the transmission of the NDPA; and receiving the sounding feedback responsive to the NDP.

In some aspects, each of the first two bits of the sounding dialogue token field may have a value equal to 1. In some implementations, the bandwidth information may be carried in a partial bandwidth information subfield that is less than 14 bits in length. In some implementations, the first STA information field may include one or more reserved bits. In some implementations, the first STA information field may include an Nc subfield that is 4 bits in length. In some implementations, the Nc subfield may indicate a number of spatial streams or a number of columns of a feedback matrix to be included in the sounding feedback. In some implementations, the first STA information field may include an AID subfield having a special AID value that is not assigned to any STAs associated with the same BSS as the wireless communication device. In some implementations, the first STA information field may further include a partial BSSID subfield having a value associated with the BSS and a NumSTAInfoFields subfield indicating a number (N) of STA information fields following the first STA information field, where each of the N STA information fields is identified based on a respective AID value and the value indicated by the partial BSSID subfield.

In some aspects, the NDP may be a PPDU having a physical layer preamble that includes an L-SIG, an RL-SIG that follows L-SIG, and a U-SIG that follows RL-SIG and carries information indicating that the PPDU is an NDP. In some implementations, the information carried in U-SIG may include compression mode information indicating a compression mode associated with an MU PPDU format. In some implementations, the physical layer preamble may further include an EHT-SIG that follows U-SIG, where EHT-SIG includes a common field and zero user fields. In some implementations, the information carried in U-SIG may include a value of an EHT-SIG MCS field indicating an MCS associated with EHT-SIG and may include a value of a number of EHT-SIG symbols field indicating a number of symbols associated with EHT-SIG. In some implementations, the value of the EHT-SIG MCS field may indicate MCS0 and the value of the number of EHT-SIG symbols field may indicate 1 EHT-SIG symbol.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 9 shows an example frame structure of a non-legacy PPDU allocated over multiple subchannels of a wireless channel according to some implementations.

Like reference numbers and designations in the various drawings indicate like elements.

DETAILED DESCRIPTION

Figure 1:
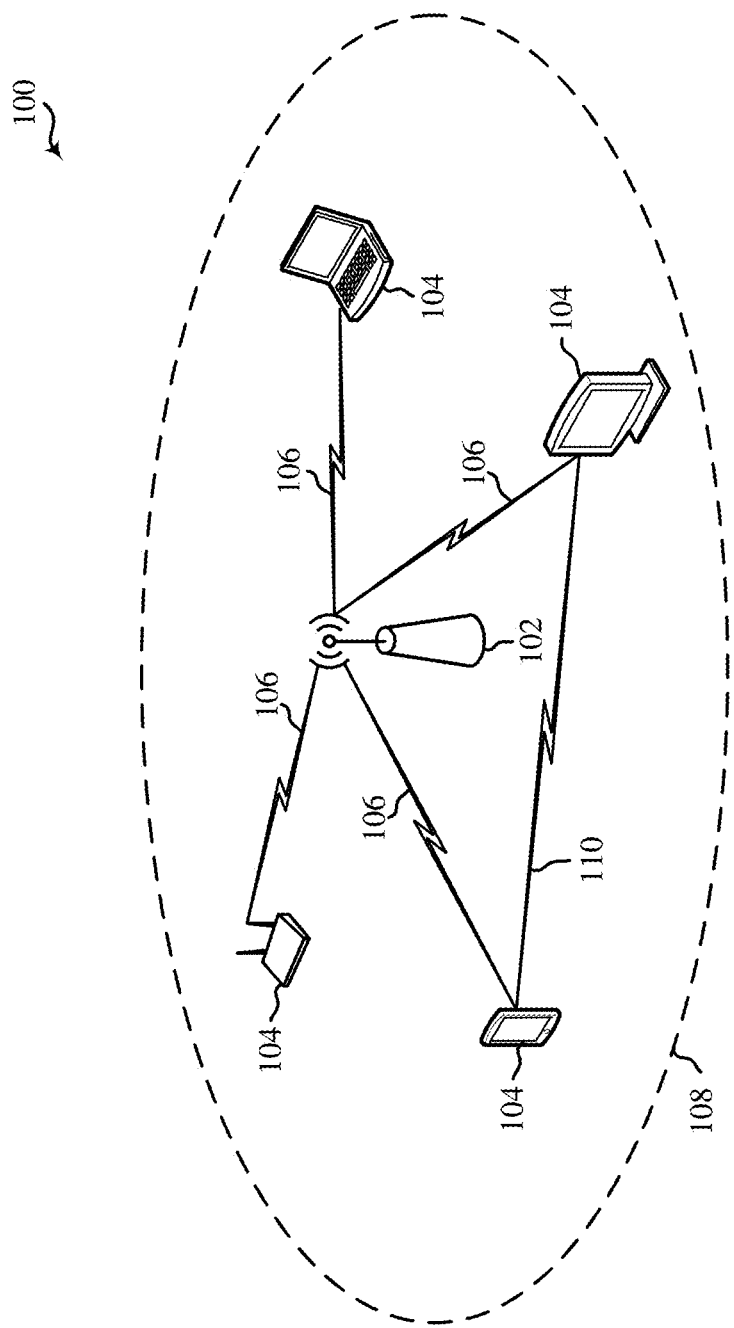
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

Various aspects relate generally to channel sounding techniques that support new wireless communication protocols, and more particularly, to sounding packet designs that support channel sounding over a greater range of bandwidths and numbers of spatial streams achievable in accordance with the IEEE 802.11be amendment, and future generations, of the IEEE 802.11 standard. In some aspects, an enhanced null data packet announcement (NDPA) frame may be configurable to support multiple versions of the IEEE 802.11 standard. For example, the enhanced NDPA frame may be configured in accordance with a legacy NDPA frame format or a non-legacy NDPA frame format. As used herein, the term "non-legacy" may refer to physical layer convergence protocol (PLCP) protocol data unit (PPDU) formats and communication protocols conforming to the IEEE 802.11be amendment, and future generations, of the IEEE 802.11 standard. In contrast, the term "legacy" may be used herein to refer to PPDU formats and communication protocols conforming to the IEEE 802.11ax or 802.11ac amendment of the IEEE 802.11 standard, or earlier generations of the IEEE 802.11 standard, but not conforming to all mandatory features of the IEEE 802.11be amendment, or future generations, of the IEEE 802.11 standard. In some other aspects, the enhanced NDPA frame may include a partial basic service set identifier (BSSID) subfield carrying information identifying a particular basic service set (BSS). The partial BSSID subfield may be associated with one or more wireless station (STA) information fields of the NDPA frame. As a result, each STA information field may uniquely identify a respective STA based on an association identifier (AID) value and the information in the associated BSSID subfield. Still further, in some aspects, a non-legacy PPDU may include signaling to indicate whether the non-legacy PPDU is formatted as a sounding NDP.

Particular implementations of the subject matter described in this disclosure can be implemented to realize one or more of the following potential advantages. Aspects of the present disclosure provide an enhanced NDPA frame format that supports channel sounding over greater bandwidths and numbers of spatial streams achievable in accordance with the IEEE 802.11be amendment, or future generations, of the IEEE 802.11 standard. Among other examples, the enhanced NDPA frame of the present implementations may be used to request sounding feedback associated with bandwidths of up to at least 320 MHz, on up to at least 16 spatial streams. By associating a partial BSSID subfield with one or more STA information fields of the NDPA frame, aspects of the present disclosure may support multiple-access point (multi-AP) sounding operations whereby APs belonging to overlapping BSSs (OBSSs) perform channel sounding, concurrently, with their associated STAs. More specifically, each STA participating in a multi-AP sounding operation may be uniquely identified by a respective AID value and its associated BSS. Some aspects of the present disclosure further support a unified non-legacy PPDU format that can be used to implement a null data packet (NDP) as well as various other PPDU types.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Figure 2A:
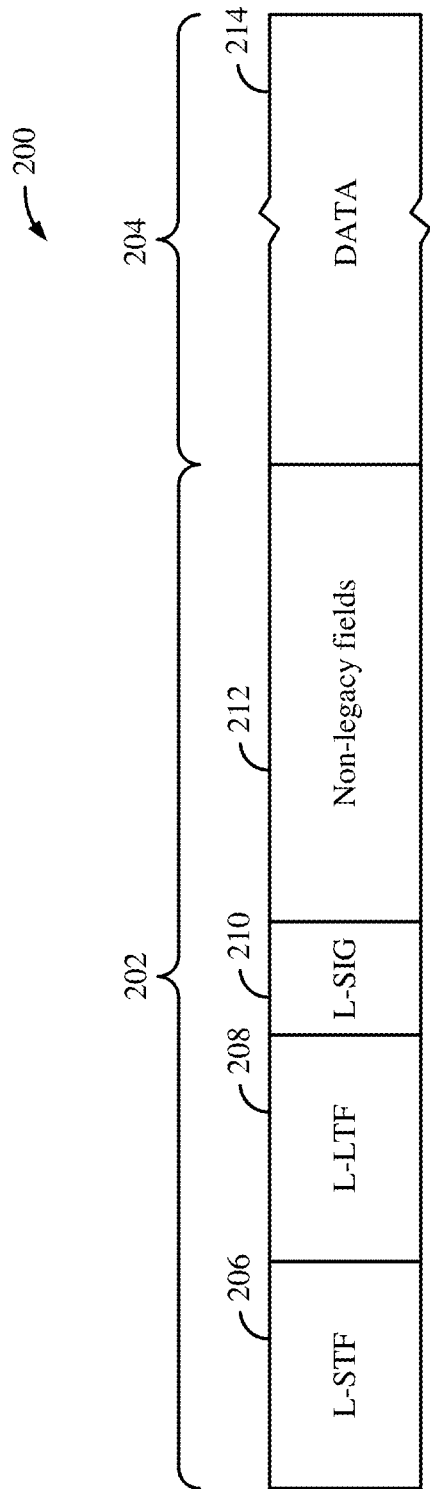
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
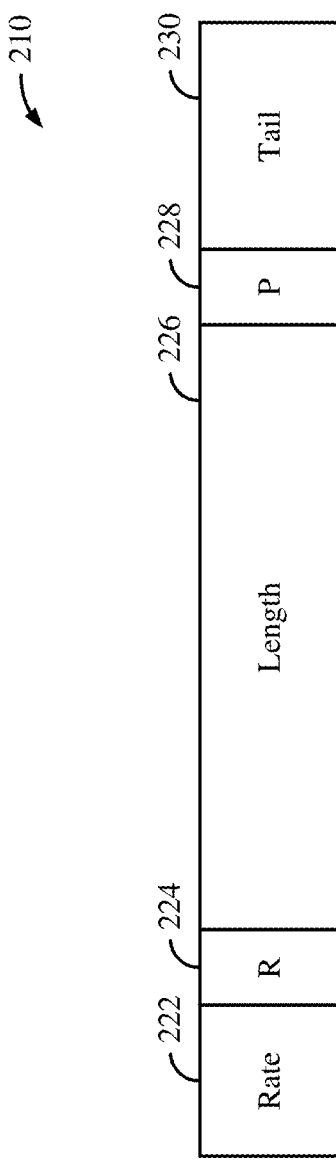
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
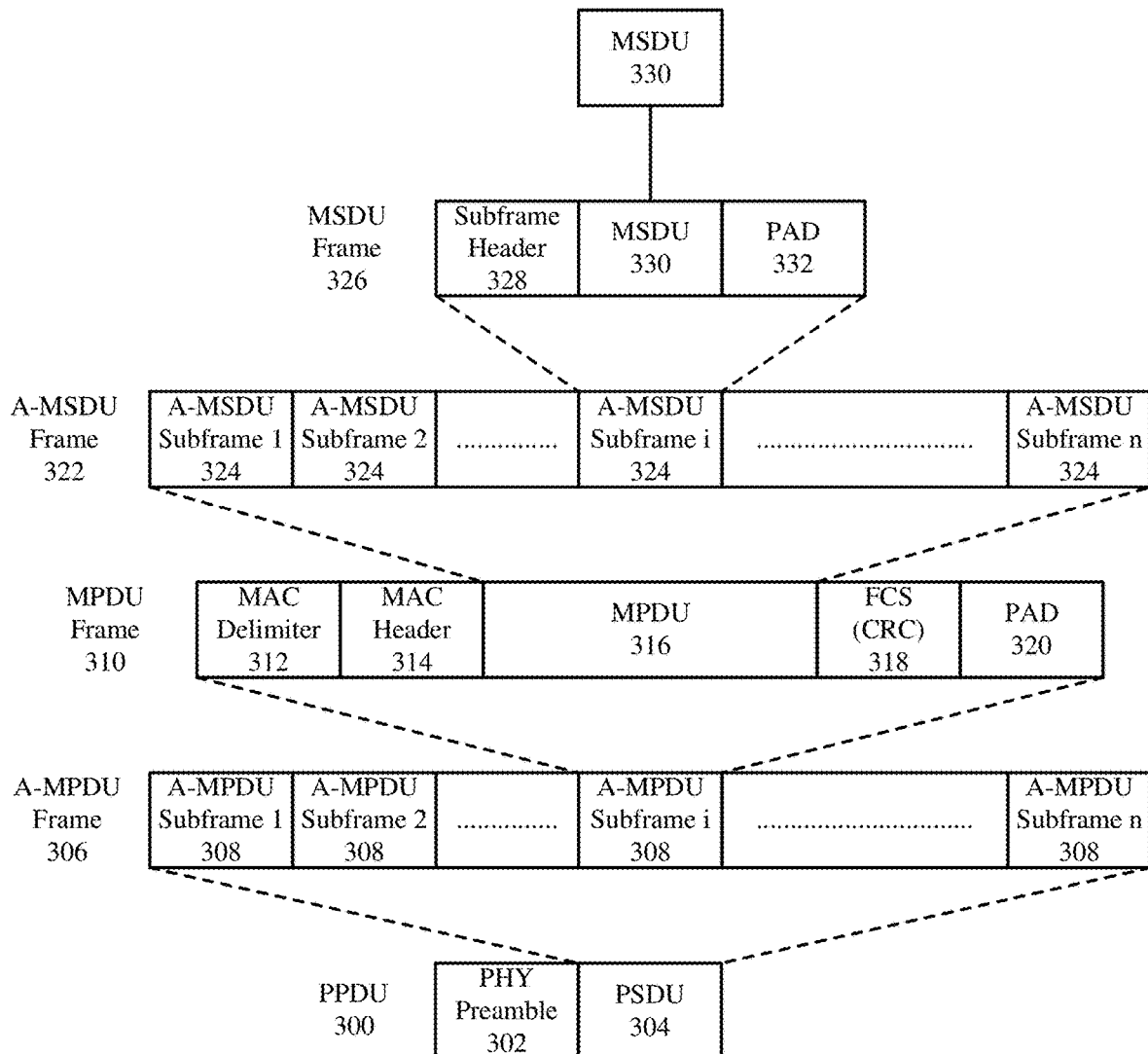
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 316. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
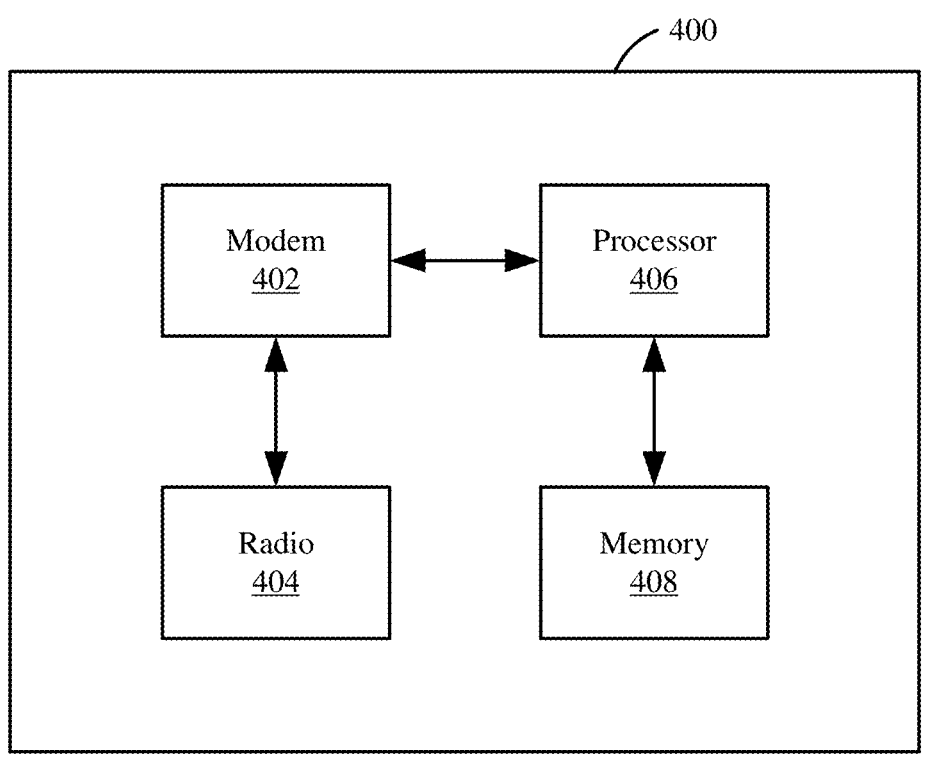
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 404 can include tangible storage media such as random-access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
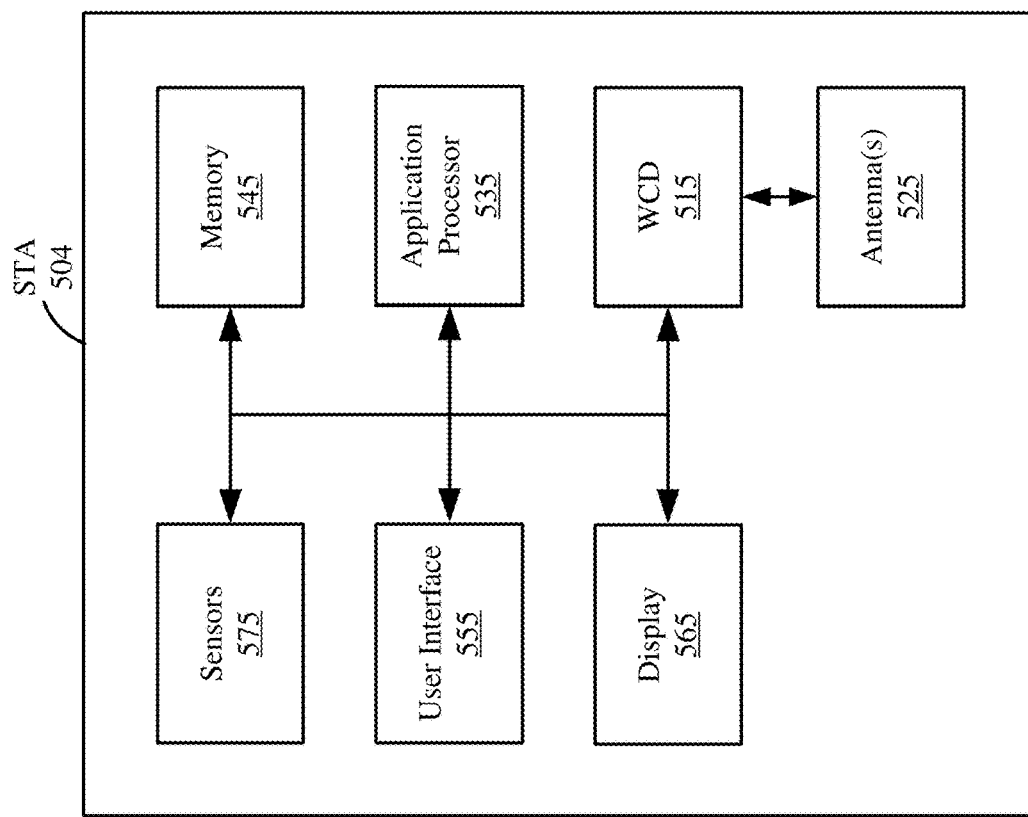
FIG. 5B shows a block diagram of an example STA.
Figure 5A:
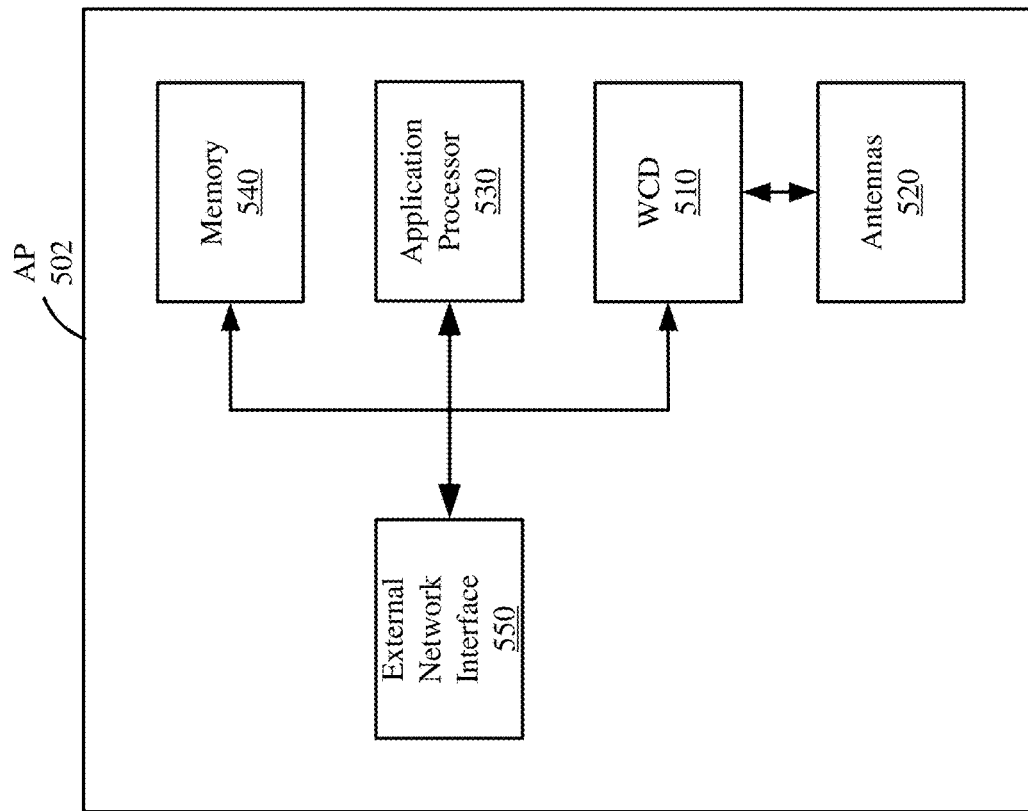
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, new WLAN communication protocols are being developed to enable enhanced WLAN communication features. Such enhanced features include, among other examples, increases in bandwidth (up to 320 MHz) and number of spatial streams (up to 16 spatial streams). As new wireless communication protocols enable enhanced features, new preamble designs are needed support signaling regarding features and resource allocations. Signaling refers to control fields or information that can be used by a wireless communication device to interpret another field or portion of a packet. For some wireless communication techniques, such as OFDMA, a wireless channel may utilize multiple subchannels that can be divided or grouped in a transmission to form different resource units (RUs). The signaling can indicate which RUs include data for a particular recipient. Other types of signaling include indicators regarding which subchannels carry further signaling or which subchannels are punctured. Still further, some signaling can indicate the lengths or availability of one or more fields or subfields in the data packet.

Figure 6:
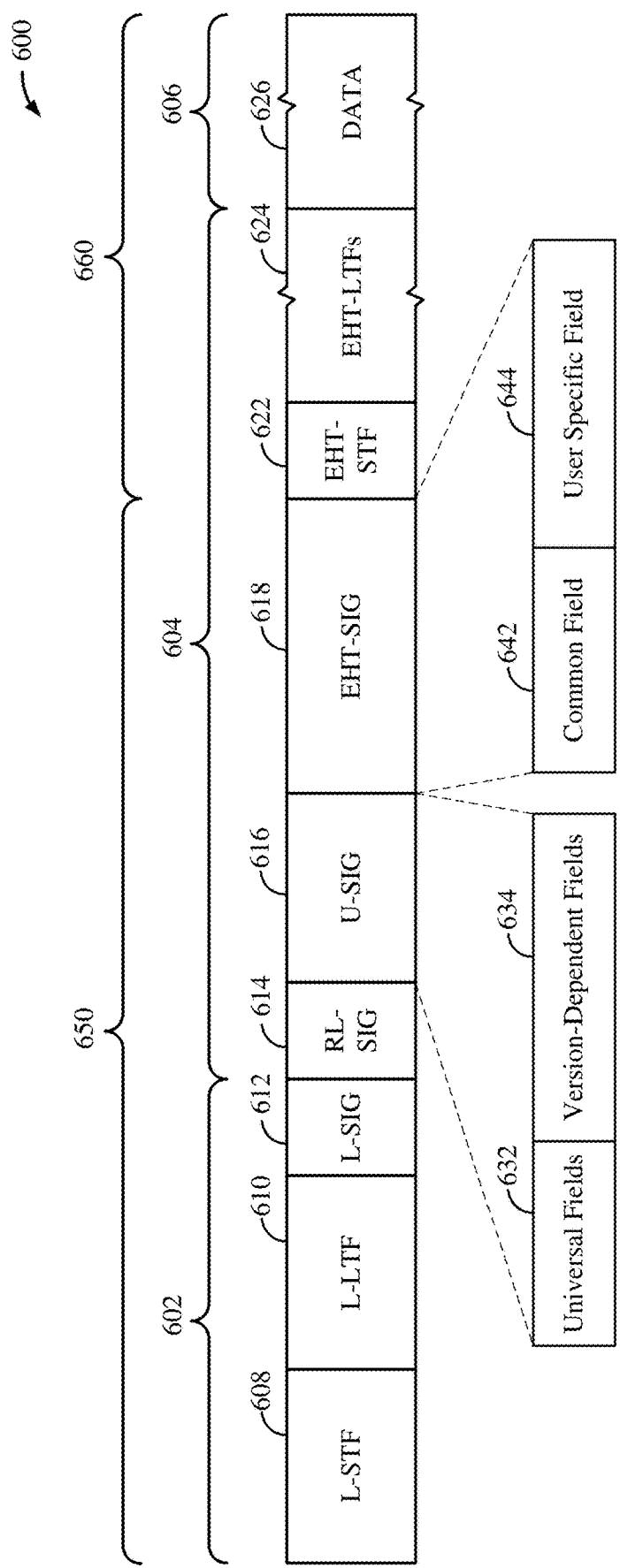
FIG. 6 shows an example PPDU usable for communications between an AP and a number of STAs according to some implementations.

FIG. 6 shows an example PPDU 600 usable for wireless communication between an AP and a number of STAs according to some implementations. The PPDU 600 may be used for SU, MU-OFDMA or MU-MIMO transmissions. The PPDU 600 includes a PHY preamble including a first portion 602 and a second portion 604. The PPDU 600 may further include a PHY payload 606 after the preamble, for example, in the form of a PSDU including DATA field 626.

The first portion 602 includes L-STF 608, L-LTF 610, and L-SIG 612. The second portion 604 of the preamble and DATA field 626 may be formatted as a non-legacy, or Extremely High Throughput (EHT), WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol amendment or other standard. In some implementations, the PPDU 600 also may be additionally logically partitioned into a pre-EHT portion 650 (including PPDU fields 608-618) and an EHT portion 660 (including PPDU fields 622-626).

The second portion 604 of the preamble includes a repeated legacy signal field (RL-SIG) 614 and multiple wireless communication protocol version-dependent signal fields after RL-SIG 614. For example, the second portion 604 may include a universal signal field (U-SIG) 616, a non-legacy signal field (EHT-SIG) 618, a non-legacy short training field (EHT-STF) 622, and a number of non-legacy long training fields (EHT-LTFs) 624.

In some implementations, U-SIG 616 may include one or more universal fields 632 and one or more version-dependent fields 634. Information in the universal fields 632 may include, for example, a version identifier (starting from the IEEE 802.11be amendment and beyond) and channel occupancy and coexistence information (such as a punctured channel indication). The version-dependent fields 634 may include format information fields used for interpreting other fields of U-SIG 616 and EHT-SIG 618. In some implementations, the version-dependent fields 634 may include a PPDU format field. The PPDU format field may indicate a general PPDU format for the PPDU 600 (such as a trigger-based (TB), SU, or MU PPDU format).

In some implementations, EHT-SIG 618 may include a common field 642 and a user specific field 644. The common field 642 may include one or more bits or fields overflowed from U-SIG 616 or RU allocation information for intended recipients of the PPDU 600. The user specific field 644 may include one or more user fields carrying per-user information for one or more intended recipients of the PPDU 600. In some implementations, RU allocation information and the user specific field 644 may be absent from the SU PPDU format. Still further, in some implementations, EHT-SIG 618 may be absent from the TB PPDU format.

As described previously, in IEEE 802.11be, and future generations, new fields may be used to carry signaling information. For example, at least some of the new fields and signaling information may be included in U-SIG 616. Additionally, new fields and signaling information may be included in EHT-SIG 618 (or may overflow from U-SIG 616 into EHT-SIG 618). In some implementations, U-SIG 616 may include signaling regarding types or formats of additional signal fields (such as EHT-SIG 618) that follow U-SIG 616. EHT-SIG 618 may be used by an AP to identify and inform one or more STAs 104 that the AP has scheduled UL or DL resources. EHT-SIG 618 may be decoded by each compatible STA 104 served by the AP 102. EHT-SIG 618 may generally be used by a receiving device to interpret bits in the DATA field 626. In the context of DL MU-OFDMA, such information enables the respective STAs 104 to identify and decode corresponding RUs in the associated DATA field 626.

Figure 7A:
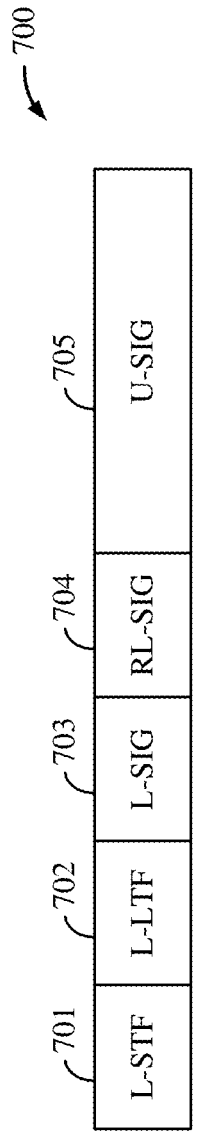
FIG. 7A shows an example frame structure for a trigger-based (TB) PPDU according to some implementations.

FIG. 7A shows an example frame structure for a TB PPDU 700 according to some implementations. In some implementations, the TB PPDU 700 may be one example of the PPDU 600 of FIG. 6. For simplicity, only the pre-EHT portion of the TB PPDU 700 (corresponding to the portion 650 of PPDU 600) is shown in FIG. 7A. The TB PPDU 700 includes an L-STF 701, an L-LTF 702, an L-SIG 703, an RL-SIG 704, and a U-SIG 705 which may correspond to L-STF 608, L-LTF 610, L-SIG 612, RL-SIG 614, and U-SIG 616, respectively, of PPDU 600. In the example TB PPDU format, the TB PPDU 700 may not include an EHT-SIG. With reference for example to FIG. 6, the TB PPDU 700 may not include any U-SIG overflow, RU allocation information, or other user-specific information (such as provided in the user specific field 644).

Figure 7B:
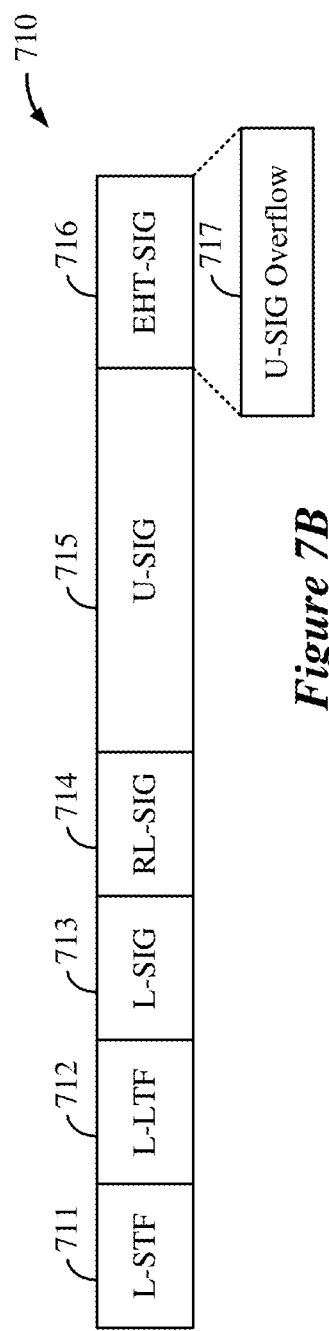
FIG. 7B shows an example frame structure for a single-user (SU) PPDU according to some implementations.

FIG. 7B shows an example frame structure for an SU PPDU 710 according to some implementations. In some implementations, the SU PPDU 710 may be one example of the PPDU 600 of FIG. 6. For simplicity, only the pre-EHT portion of the SU PPDU 710 (corresponding to the portion 650 of PPDU 600) is shown in FIG. 7B. The SU PPDU 710 includes an L-STF 711, an L-LTF 712, an L-SIG 713, an RL-SIG 714, a U-SIG 715, and an EHT-SIG 716 which may correspond to L-STF 608, L-LTF 610, L-SIG 612, RL-SIG 614, U-SIG 616, and EHT-SIG 616, respectively, of PPDU 600. In the example SU PPDU format, EHT-SIG 716 may include only bits or fields 717 overflowed from U-SIG 715. With reference for example to FIG. 6, the SU PPDU 710 may not include any RU allocation information, or other user-specific information (such as provided in the user specific field 644).

Figure 7C:
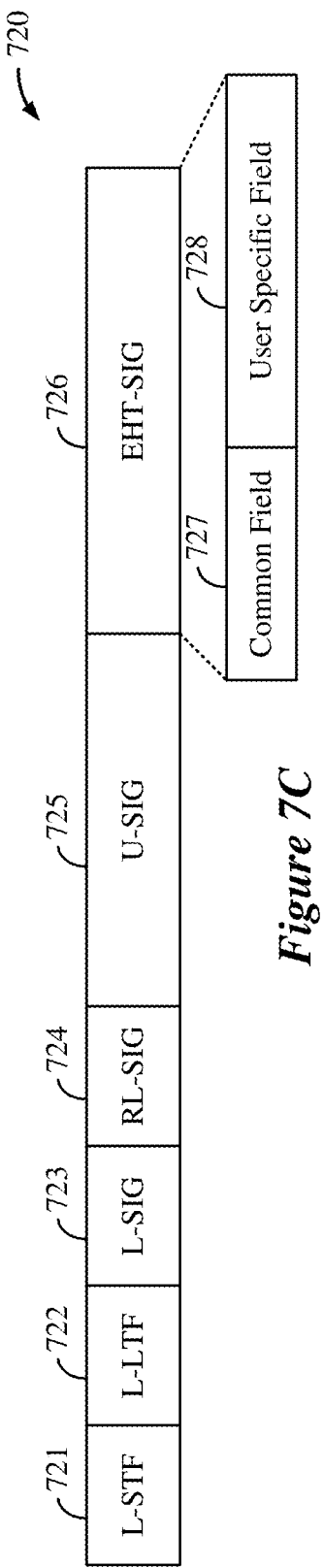
FIG. 7C shows an example frame structure for a multi-user (MU) PPDU according to some implementations.

FIG. 7C shows an example frame structure for a MU PPDU 720 according to some implementations. In some implementations, the MU PPDU 720 may be one example of the PPDU 600 of FIG. 6. For simplicity, only the pre-EHT portion of the MU PPDU 720 (corresponding to the portion 650 of PPDU 600) is shown in FIG. 7C. The MU PPDU 720 includes an L-STF 721, an L-LTF 722, an L-SIG 723, an RL-SIG 724, a U-SIG 725, and an EHT-SIG 726 which may correspond to L-STF 608, L-LTF 610, L-SIG 612, RL-SIG 614, U-SIG 616, and EHT-SIG 616, respectively, of PPDU 600. In the example MU PPDU format, EHT-SIG 726 may include a common field 727 and a user specific field 728. With reference for example to FIG. 6, the common field 642 may further include U-SIG overflow or RU allocation information. The user specific field 728 may include per-user information for one or more intended recipients of the MU PPDU 720.

In some implementations, the MU PPDU format may be used for full-bandwidth SU and MU-MIMO communications. For example, a full-bandwidth SU frame format may be implemented as a "compression mode" of the MU PPDU format (in lieu of the SU PPDU format of FIG. 7B). More specifically, the full-bandwidth SU frame format may be implemented by compressing (reducing or eliminating) one or more fields or subfields of the MU PPDU 720. In some aspects, a punctured SU frame format (to indicate SU preamble puncturing) may be implemented as another compression mode of the MU PPDU format. For example, the punctured SU frame format also may be implemented by compressing one or more fields or subfields of the MU PPDU 720. The different compression modes may be implemented, at least in part, by compressing (or not compressing) the RU allocation information in the common field 727. For example, the RU allocation information may be omitted in the full-bandwidth SU (or MU-MIMO) frame format. Additionally, or alternatively, the RU allocation information may be substituted for a punctured channel table in the punctured SU (or MU-MIMO) frame format. The example compression modes are summarized in Table 1.

TABLE 1

|  | Multiple Users (MU) | |
| --- | --- | --- |
|  | Single User (SU) | MU-MIMO | OFDMA |
| Full Bandwidth |  | Compression Mode 1 | No Compression |
| Punctured |  | Compression Mode 2 | |

As shown in Table 1, a first compression mode (compression mode 1) may be used for full-bandwidth SU or MU-MIMO communications, a second compression mode (compression mode 2) may be used for punctured SU or MU-MIMO communications, and no compression may be used for OFDMA (full-bandwidth or punctured) communications. By selectively compressing one or more fields or subfields of the MU PPDU 720, aspects of the present disclosure may provide a unified PPDU format usable for full-bandwidth or punctured SU and MU communications. In some implementations, the unified PPDU format may include other compression modes not identified in Table 1.

Figure 8:
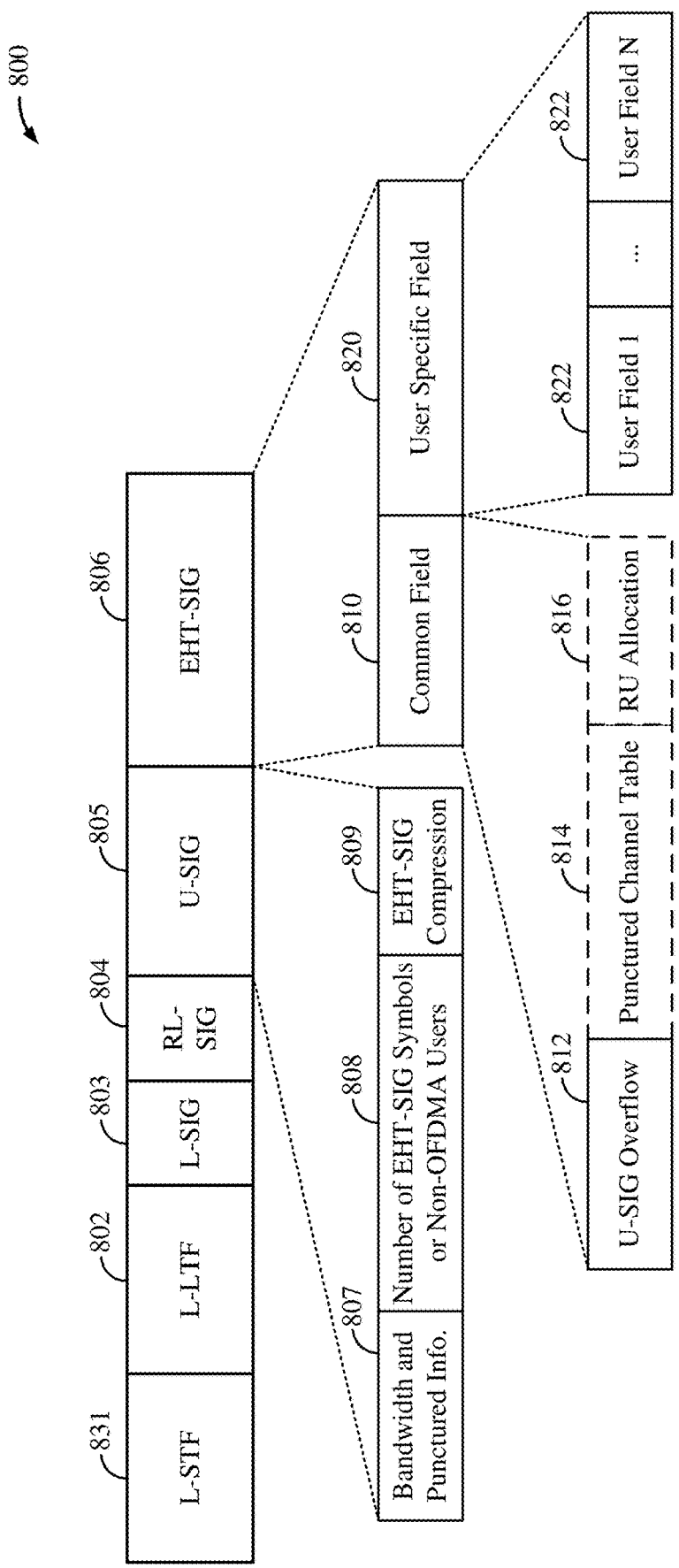
FIG. 8 shows an example frame structure for a unified PPDU according to some implementations.

FIG. 8 shows an example frame structure for a unified PPDU 800 according to some implementations. In some implementations, the unified PPDU 800 may be one example of the PPDU 600 of FIG. 6. For simplicity, only the pre-EHT portion of the unified PPDU 800 (corresponding to the portion 650 of PPDU 600) is shown in FIG. 8. The unified PPDU 800 includes an L-STF 801, an L-LTF 802, an L-SIG 803, an RL-SIG 804, a U-SIG 805, and an EHT-SIG 806 which may correspond to L-STF 608, L-LTF 610, L-SIG 612, RL-SIG 614, U-SIG 616, and EHT-SIG 618, respectively, of PPDU 600. In the example unified PPDU format, U-SIG 805 may include a bandwidth and punctured information field 807, a number of EHT-SIG symbols or non-OFDMA users field 808, and an EHT-SIG compression field 809. The EHT-SIG 806 may include a common field 810 and a user specific field 820.

In some implementations, the unified PPDU 800 may be configured for full-bandwidth SU or MU-MIMO communications, punctured SU or MU-MIMO communications, or OFDMA communications. With reference for example to Table 1, the unified PPDU 800 may be configured in the first compression mode, the second compression mode, or without compression. When no compression is implemented, the unified PPDU 800 may be configured for OFDMA, and the common field 810 may include U-SIG overflow 812 and RU allocation information 816. When the first compression mode is implemented, the unified PPDU 800 may be configured for full-bandwidth SU or MU-MIMO communications, and the common field 810 may include U-SIG overflow 812 while omitting RU allocation information 816. When the second compression mode is implemented, the unified PPDU 800 may be configured for punctured SU or MU-MIMO communications, and the common field 810 may include a punctured channel table 814 (in lieu of RU allocation information 816). The punctured channel table 814 may indicate the punctured channels of the unified PPDU 800. In some implementations, the punctured channels may be specified with a 20 MHz granularity.

The EHT-SIG compression field 809 may be used to indicate the mode or configuration of the unified PPDU 800. In some implementations, the EHT-SIG compression field 809 may include 2 bits that can be used to indicate any of the 3 different configurations (such as the first compression mode, the second compression mode, or no compression). In some other implementations, the EHT-SIG compression field 809 may include 1 bit that can be used to indicate whether the unified PPDU 800 is configured for compression (or no compression) while the bandwidth and punctured information field 807 may be used to further differentiate between the first compression mode and the second compression mode.

One or more of the compression modes may be used for SU or MU-MIMO communications. For example, the first compression mode may be used for full-bandwidth SU or full-bandwidth MU-MIMO communications. Similarly, the second compression mode may be used for SU preamble puncturing or MU-MIMO preamble puncturing. In some implementations, the number of EHT-SIG symbols or non-OFDMA users field 808 may include an integer number (k) that can be used to indicate whether the unified PPDU 800 is configured for SU or MU-MIMO communications when implementing one of the compression modes. More specifically, k+1 may correspond to the number of non-OFDMA users associated with the unified PPDU 800. Thus, a value k=0 may indicate SU communications and any value k≥1 may indicate MU-MIMO communications.

The user specific field 820 includes a number of user fields 822. The number of user fields 822 may depend on the total number of users associated with the unified PPDU 800. When configured for SU communications (in the first compression mode or the second compression mode), a single user field 822 may be formatted according to a non-MU-MIMO allocation format. The user field for a non-MU-MIMO allocation may include NSTS, beamformed, and DCM subfields (indicating a number of space-time streams, whether beamforming is used, and whether DCM is used, respectively) that are not present in the user field for a MU-MIMO allocation. When configured for MU-MIMO communications (in the first compression mode or the second compression mode), multiple user fields may be formatted according to a MU-MIMO allocation format. The user field for a MU-MIMO allocation may include a spatial configuration subfield (indicating a number of spatial streams for a STA) that is not present in the user field for the non-MU-MIMO allocation.

Figure 9:
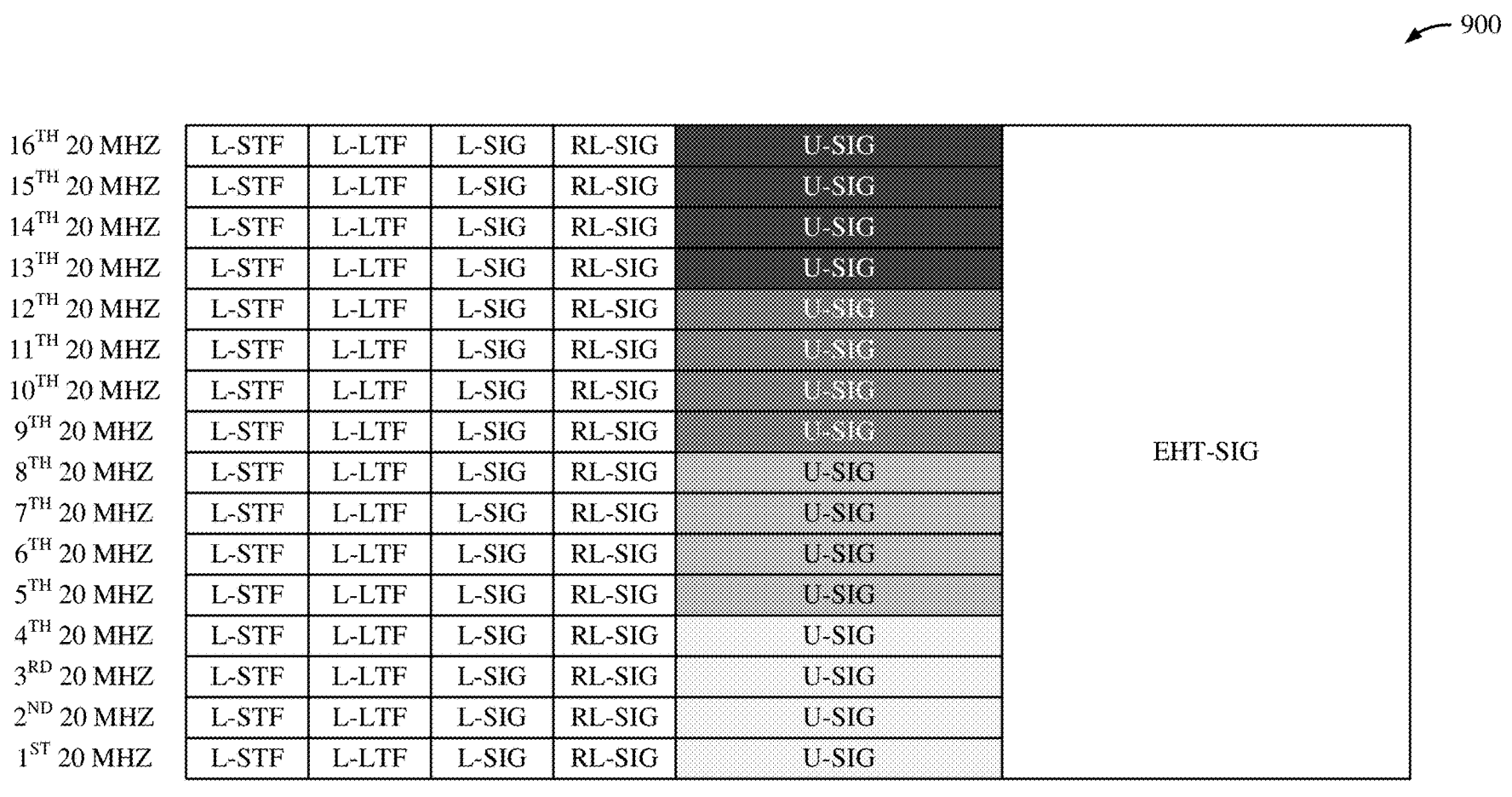

FIG. 9 shows an example frame structure of a non-legacy PPDU 900 allocated over multiple subchannels of a wireless channel according to some implementations. In some implementations, the non-legacy PPDU 900 may be one example of the PPDU 600 of FIG. 6. In the example of FIG. 9, the non-legacy PPDU 900 is shown to include an L-STF, an L-LTF, an L-SIG, an RL-SIG, a U-SIG, and an EHT-SIG signaled or transmitted on multiple 20 MHz subchannels (or frequency segments) of a 320 MHz wireless channel. In some other implementations, the wireless channel may encompass any range of frequencies including, but not limited to, a 160 MHz frequency spectrum, a 240 MHz frequency spectrum, a 480 MHz frequency spectrum, or a 640 MHz frequency spectrum. As shown in FIG. 9, the 320 MHz frequency spectrum includes sixteen 20 MHz subchannels indexed from lowest to highest (such as from the $1^{st}$ to the $16^{th}$).

In the example of FIG. 9, L-STF, L-LTF, L-SIG, and RL-SIG are duplicated or repeated in each 20 MHz subchannel spanning the entirety of the 320 MHz frequency spectrum. In some implementations, U-SIG may be duplicated or repeated in each 20 MHz subchannel of a respective 80 MHz segment of the wireless channel. For example, the first four subchannels ($1^{st}$ through $4^{th}$) may share the same U-SIG fields and values. The next four subchannels ($5^{th}$ through $8^{th}$) may share the same U-SIG fields and values, which may be different than the U-SIG fields or values of the previous four subchannels. The next four subchannels ($9^{th}$ through $12^{th}$) may share the same U-SIG fields and values, which in turn may be different than the U-SIG fields or values in any of the previous eight subchannels. The next four subchannels ($13^{th}$ through $16^{th}$) may share the same U-SIG fields and values, which in turn may be different than the U-SIG fields or values in any of the previous twelve subchannels. In other words, the U-SIG fields or values may change every 80 MHz. This may allow for greater parallelization of U-SIG information across the various subchannels.

In some implementations, EHT-SIG may be signaled on a number of content channels. Each content channel may be defined by a particular grouping of subchannels. For example, a first content channel may carry the signaling information for all odd-numbered subchannels (such as the $1^{st}$, $3^{rd}$, $5^{th}$, $7^{th}$, $9^{th}$, $11^{th}$, $13^{th}$, and $15^{th}$ 20 MHz subchannels) and a second content channel may carry the signaling information for all even-numbered subchannels (such as the $2^{nd}$, $4^{th}$, $6^{th}$, $8^{th}$, $10^{th}$, $12^{th}$, $14^{th}$, and $16^{th}$ 20 MHz subchannels). In some implementations, EHT-SIG may be duplicated or repeated per content channel. For example, the (odd-numbered) subchannels associated with the first content channel may share the same EHT-SIG fields and values. The (even-numbered) subchannels associated with the second content channel may share the same EHT-SIG fields and values, which may be different than the EHT-SIG fields or values of the first content channel.

As described above, channel sounding is a technique for measuring the channel conditions of a shared wireless communication medium between a transmitting (TX) device and a receiving (RX) device. Existing versions of the IEEE 802.11 standards define a channel sounding procedure based on the transmission of null data packets (NDPs). The TX device may initiate a channel sounding operation by transmitting an NDP announcement (NDPA) frame, followed by an NDP, to the RX device. The RX device estimates the channel conditions based on the received NDP and transmits a feedback message, including information about the channel conditions, back to the TX device. The TX device may use the information about the channel condition to adjust or configure subsequent communications (such as for link adaptation or beamforming) with the RX device. As new WLAN communication protocols enable enhanced features, new sounding packet designs are needed to support channel sounding over greater bandwidths and numbers of spatial streams.

Various aspects relate generally to channel sounding techniques that support new wireless communication protocols, and more particularly, to sounding packet designs that support channel sounding over a greater range of bandwidths and numbers of spatial streams achievable in accordance with the IEEE 802.11be amendment, and future generations, of the IEEE 802.11 standard. In some aspects, an enhanced NDPA frame may be configurable to support multiple versions of the IEEE 802.11 standard. For example, the enhanced NDPA frame may be configured in accordance with a legacy NDPA frame format or a non-legacy NDPA frame format. As used herein, the term "non-legacy" may refer to PPDU formats and communication protocols conforming to the IEEE 802.11be amendment, and future generations, of the IEEE 802.11 standard. In contrast, the term "legacy" may be used herein to refer to PPDU formats and communication protocols conforming to the IEEE 802.11ax or 802.11ac amendment of the IEEE 802.11 standard, or earlier generations of the IEEE 802.11 standard, but not conforming to all mandatory features of the IEEE 802.11be amendment, or future generations, of the IEEE 802.11 standard. In some other aspects, the enhanced NDPA frame may include a partial BSSID subfield carrying information identifying a particular BSS. The partial BSSID subfield may be associated with one or more STA information fields of the NDPA frame. As a result, each STA information field may uniquely identify a respective STA based on an association identifier (AID) value and the information in the associated BSSID subfield. Still further, in some aspects, a non-legacy PPDU may include signaling to indicate whether the non-legacy PPDU is formatted as a sounding NDP.

Particular implementations of the subject matter described in this disclosure can be implemented to realize one or more of the following potential advantages. Aspects of the present disclosure provide an enhanced NDPA frame format that supports channel sounding over greater bandwidths and numbers of spatial streams achievable in accordance with the IEEE 802.11be amendment, or future generations, of the IEEE 802.11 standard. Among other examples, the enhanced NDPA frame of the present implementations may be used to request sounding feedback associated with bandwidths of up to at least 320 MHz, on up to at least 16 spatial streams. By associating a partial BSSID subfield with one or more STA information fields of the NDPA frame, aspects of the present disclosure may support multi-AP sounding operations whereby APs belonging to OBSSs perform channel sounding, concurrently, with their associated STAs. More specifically, each STA participating in a multi-AP sounding operation may be uniquely identified by a respective AID value and its associated BSS. Some aspects of the present disclosure further support a unified non-legacy PPDU format that can be used to implement an NDP as well as various other PPDU types.

Figure 10:
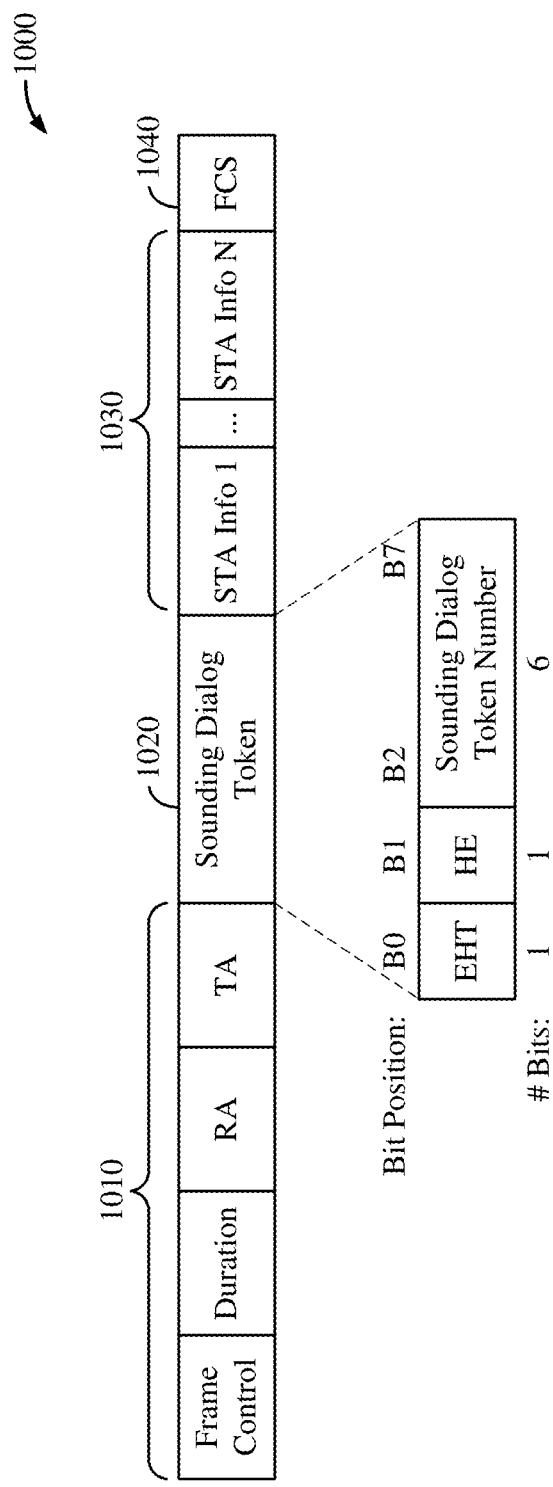
FIG. 10 shows an example null data packet announcement (NDPA) frame usable for channel sounding between an AP and a number of STAs according to some implementations.

FIG. 10 shows an example NDPA frame 1000 usable for channel sounding between an AP and a number of STAs according to some implementations. In some implementations the NDPA frame 1000 (also referred to herein as an "enhanced NDPA frame") may be configured to request sounding feedback from one or more non-legacy STAs. As used herein, the term "non-legacy STA" refers to any STA configured to operate in accordance with the IEEE 802.11be amendment, or future generations, of the IEEE 802.11 standard. In some aspects, the NDPA frame 1000 may signal or announce the transmission of a non-legacy NDP to be used by the non-legacy STAs to estimate the conditions of the wireless channel.

In some implementations, the NDPA frame 1000 also may be configured to request sounding feedback from one or more legacy STAs. As used herein, the term "legacy STA" refers to any STA configured to operate in accordance with the IEEE 802.11ax or 802.11ac amendments of the IEEE 802.11 standard. More specifically, the NDPA frame 1000 may be configured in accordance with a legacy NDPA frame format or a non-legacy NDPA frame format. When configured in accordance with the legacy NDPA frame format, the fields and subfields of the NDPA frame 1000 may conform to a legacy, or High Efficiency (HE), NDPA frame format defined by the IEEE 802.11ax amendment of the IEEE 802.11 standard. However, when configured in accordance with the non-legacy NDPA frame format, one or more fields or subfields of the NDPA frame 1000 may not conform to the legacy NDPA frame format.

The NDPA frame 1000 includes a MAC header 1010, a sounding dialog token field 1020, a number (N) of STA information fields 1030, and a frame check sequence (FCS) 1040. The MAC header 1010 includes a frame control field, a duration field, a receiver address (RA) field, and a transmitter address (TA) field. In some implementations, the MAC header 1010 may be identical to the MAC header associated with the legacy NDPA frame format. In some other implementations, the frame control field may carry information indicating a new control sub-type. The sounding dialog token field 1020 carries information indicating a sounding dialog token number associated with the NDPA frame 1000. For example, the sounding dialog token number may be selected by an AP (or TX device) to identify the NDPA frame 1000. The legacy NDPA frame format defines a sounding dialog token field that is 1 octet (8 bits) in length. Thus, to support both legacy and non-legacy NDPA frame formats, the sounding dialog token field 1020 of the NDPA frame 1000 also may be 1 octet in length.

In some implementations, the sounding dialog token field 1020 may include a non-legacy (EHT) subfield, a legacy (HE) subfield, and a sounding dialog token number subfield. As shown in FIG. 10, the EHT and HE subfields represent the first two bits (in bit positions B0 and B1, respectively) of the sounding dialog token field 1020. Aspects of the present disclosure recognize that the first bit position B0 represents a reserved bit (having a value equal to 0) in the legacy NDPA frame format. Thus, in some aspects, the values of the EHT and HE subfields may be used to indicate whether the NDPA frame 1000 is configured in accordance with the legacy NDPA frame format or the non-legacy NDPA frame format. For example, each of the EHT and HE subfields may be set to a value of 1 to indicate that the NDPA frame 1000 is configured in accordance with the non-legacy NDPA frame format. On the other hand, the EHT subfield may be set to a value of 0 to indicate that the NDPA frame 1000 is configured in accordance with the legacy NDPA frame format. More specifically, when the value of the EHT subfield is equal to 0, the value of the HE subfield may indicate whether the NDPA frame 1000 conforms to the IEEE 802.11ax amendment (HE=1) or the IEEE 802.11ac amendment (HE=0) of the IEEE 802.11 standard.

The sounding dialog token number subfield spans a remaining six bits (from bit positions B2 through B7) of the sounding dialog token field 1020, and a value of the sounding dialog token number subfield represents the sounding dialog token number associated with the NDPA frame 1000. Aspects of the present disclosure also recognize that, although the sounding dialog token number subfield is 6 bits in length, existing wireless communication devices generally do not use all 6 bits to represent the sounding dialog token number associated with a legacy NDPA frame. In particular, the last bit (in bit position B7) of the sounding dialog token number subfield, which also represents the last bit of the sounding dialog token field 1020, is left unused. In some implementations, the last bit of the sounding dialog token field 1020 may be repurposed to indicate whether the NDPA frame 1000 is configured in accordance with legacy NDPA frame format or the non-legacy NDPA frame format. For example, the last bit of the sounding dialog token field 1020 may be set to a value of 1 to indicate that the NDPA frame 1000 is configured in accordance with the non-legacy NDPA frame format. On the other hand, the last bit of the sounding dialog token field 1020 may be set to a value of 0 to indicate that the NDPA frame 1000 is configured in accordance with the legacy NDPA frame format.

Each of the STA information fields 1030 carries bandwidth information indicating a bandwidth associated with the requested sounding feedback. Such bandwidth information may include, among other examples, a range of resource units (RUs) on which the channel estimation is to be performed or one or more punctured subchannels on which the channel estimation is not to be performed. In some implementations, the subfield configuration for each STA information field 1030 may depend on the format of the NDPA frame 1000. For example, the types of subfields, the number of subfields, the size of each subfield, or the position of each subfield may be different for an NDPA frame 1000 configured in accordance with the legacy NDPA frame format compared to an NDPA frame 1000 configured in accordance with the non-legacy NDPA frame format. The legacy NDPA frame format defines a STA information field that is 4 octets (32 bits) in length. Thus, to support both legacy and non-legacy NDPA frame formats, each STA information field 1030 of the NDPA frame 1000 also may be 4 octets in length.

Figure 11A:
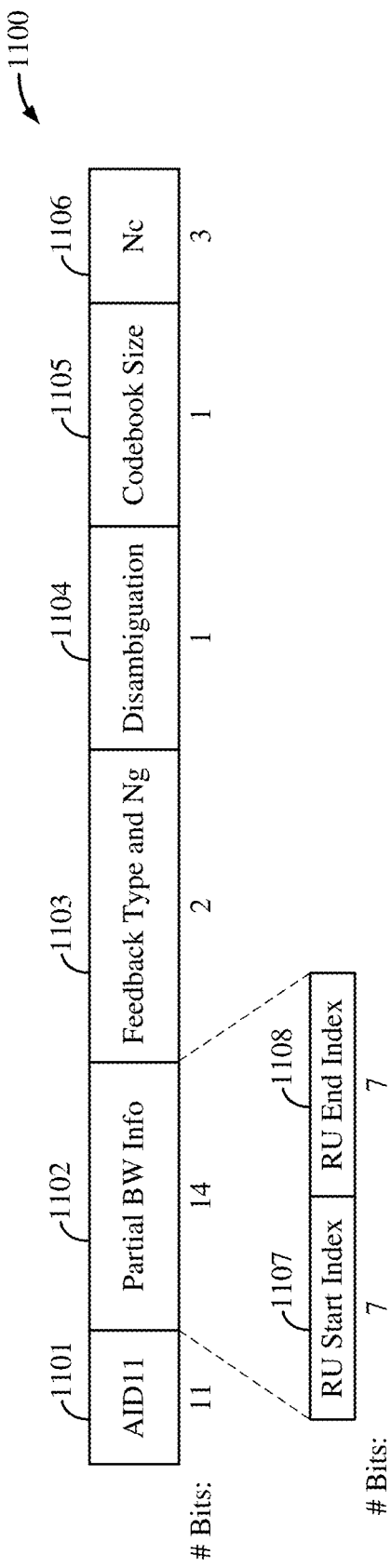
FIG. 11A shows a format of a STA information field for a legacy NDPA frame.

FIG. 11A shows a format of a STA information field 1100 for a legacy NDPA frame. More specifically, the format of the STA information field 1100 may be defined by the IEEE 802.11ax amendment of the IEEE 802.11 standard. In some implementations, the STA information field 1100 may be an example of one of the user information fields 1030, of FIG. 10, when the NDPA frame 1000 is configured in accordance with the legacy NDPA frame format.

The IEEE 802.11ax amendment of the IEEE 802.11 standard defines two STA information field formats for a legacy NDPA frame. In a first format, the STA information field has an association identifier (AID) value that is equal to the AID value assigned to a particular STA in a given BSS. In a second format, the STA information field has a special AID value that is not assigned to any STA in the BSS. In the example of FIG. 11A, the STA information field 1100 is depicted in the first format. More specifically, the STA information field 1100 includes an AID11 subfield 1101, a partial bandwidth (BW) information subfield 1102, a feedback type and subcarrier grouping (Ng) subfield 1103, a disambiguation subfield 1104, a codebook size subfield 1105, and a number of columns (Nc) subfield 1105. The partial bandwidth information subfield 1102 further includes an RU start index subfield 1107 and an RU end index subfield 1108. The sizes and contents of the subfields 1101-1108 are defined by the IEEE 802.11ax amendment of the IEEE 802.11 standard. Because the STA information field 1100 is depicted in the first format, the value of the AID11 subfield 1101 is equal to the AID value assigned to a particular STA in the BSS.

Figure 11B:
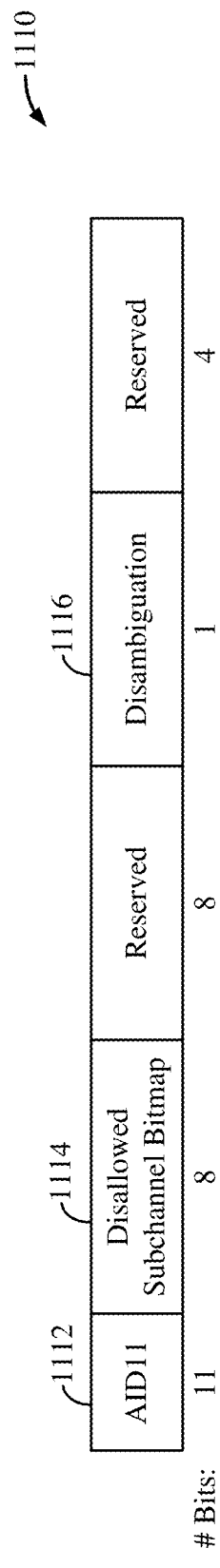
FIG. 11B shows another format of a STA information field for a legacy NDPA frame.

FIG. 11B shows another format of a STA information field 1110 for a legacy NPDA frame. More specifically, the format of the STA information field 1110 may be defined by the IEEE 802.11ax amendment of the IEEE 802.11 standard. In some implementations, the STA information field 1110 may be an example of one of the STA information fields 1030, of FIG. 10, when the NDPA frame 1000 is configured in accordance with the legacy NDPA frame format.

As described above, the IEEE 802.11ax amendment of the IEEE 802.11 standard defines two STA information field formats for a legacy NDPA frame. In the first format, the STA information field has an AID value that is equal to the AID value assigned to a particular STA in a given BSS. In the second format, the STA information field has a special AID value that is not assigned to any STA in the BSS. In the example of FIG. 11B, the STA information field 1110 is depicted in the second format. More specifically, the STA information field 1110 includes an AID11 subfield 1112, a disallowed subchannel bitmap subfield 1114, and a disambiguation subfield 1116. The sizes and contents of the subfields 1112-1116 are defined by the IEEE 802.11ax amendment of the IEEE 802.11 standard. Because the STA information field 1110 is depicted in the second format, the value of the AID11 subfield 1112 is equal to a special AID value that is not assigned to any STAs in the BSS. The special AID value for the legacy NDPA frame format is equal to 2047.

Figure 12A:
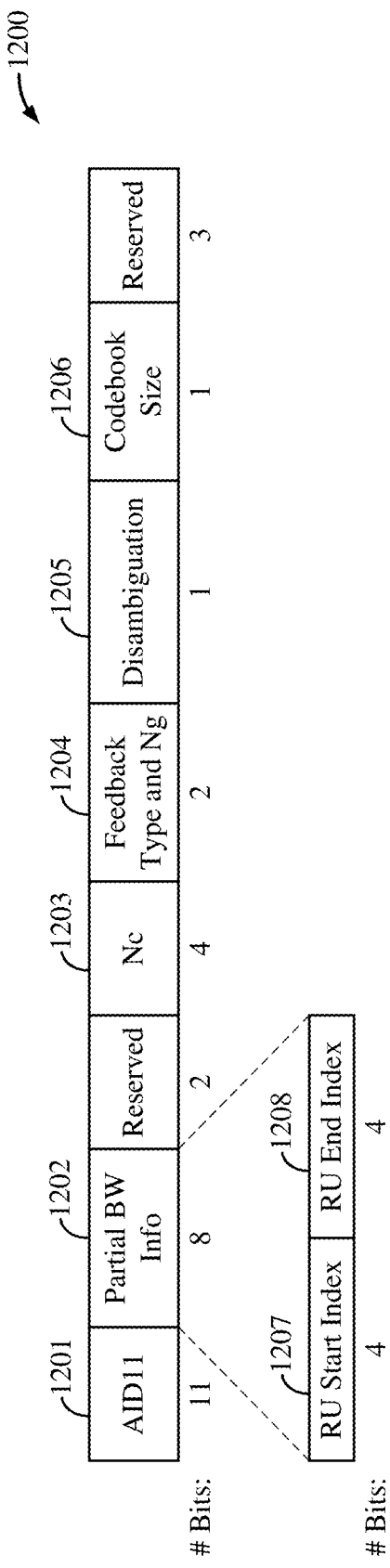
FIG. 12A shows an example format of a STA information field for an enhanced NDPA frame according to some implementations.

FIG. 12A shows an example format of a STA information field 1200 for an enhanced NDPA frame according to some implementations. In some implementations, the STA information field 1200 may be an example of one of the STA information fields 1030, of FIG. 10, when the NDPA frame 1000 is configured in accordance with the non-legacy NDPA frame format. More specifically, the example STA information field 1200 represents a first format of a STA information field capable of supporting the enhanced features of the IEEE 802.11be amendment, and future generations, of the IEEE 802.11 standard.

In the example of FIG. 12A, the STA information field 1200 includes an AID11 subfield 1201, a partial bandwidth information subfield 1202, an Nc subfield 1203, a feedback type and Ng subfield 1204, a disambiguation subfield 1205, and codebook size subfield 1206. With reference for example to FIG. 11A, the format of the STA information field 1200 substantially tracks the format of the STA information field 1100. In particular, the AID11 subfield 1201, the feedback type and Ng subfield 1204, the disambiguation subfield 1205, and the codebook size subfield 1206 may be substantially similar, if not identical, to the AID11 subfield 1101, the feedback type and Ng subfield 1103, the disambiguation subfield 1104, and the codebook size subfield 1105, respectively, of the STA information field 1100. Thus, the value of the AID11 subfield 1201 may be equal to the AID value assigned to a particular STA in the BSS.

The partial bandwidth information subfield 1202 carries information indicating a bandwidth associated with the requested sounding feedback, similar to the partial bandwidth information subfield 1102 of the STA information field 1100. However, in some implementations, the partial bandwidth information subfield 1202 may be substantially shorter than the partial bandwidth information subfield 1102. For example, as shown in FIG. 12A, the partial bandwidth information subfield 1202 spans only 8 bits, whereas the partial bandwidth information subfield 1102 spans 14 bits. Aspects of the present disclosure recognize that the IEEE 802.11be amendment of the IEEE 802.11 standard defines bandwidth information with a granularity of 242-tone RUs. In contrast, the IEEE 802.11ax amendment of the IEEE 802.11 standard defines bandwidth information with a granularity of 24-tone RUs. While 7 bits are needed to index a 24-tone RU (such as the starting RU index 1107 and the ending RU index 1108 of the partial bandwidth information subfield 1102), only 4 bits are needed to index a 242-tone RU. Thus, in some aspects, the partial bandwidth information subfield 1202 may include a 4-bit starting RU index 1207 and a 4-bit ending RU index 1208.

The Nc subfield 1203 carries information indicating a number of columns associated with a feedback matrix to be included in the sounding feedback, similar to the Nc subfield 1106 of the STA information field 1100. However, in some implementations, the Nc subfield 1203 may be longer than the Nc subfield 1106. For example, as shown in FIG. 12A, the Nc subfield 1203 spans 4 bits, whereas the Nc subfield 1106 spans only 3 bits. Aspects of the present disclosure recognize that the IEEE 802.11be amendment of the IEEE 802.11 standard support wireless communications on up to 16 spatial streams. In contrast, the IEEE 802.11ax amendment of the IEEE 802.11 standard only support wireless communications on up to 8 spatial streams. While 3 bits can sufficiently describe up to 8 spatial streams, at least 4 bits are needed to describe up to 16 spatial streams. Thus, in some aspects, the 4-bit value of the Nc subfield 1203 may be used to indicate up to 16 columns to be included in the feedback matrix (representing 16 spatial streams).

Because the partial bandwidth information subfield 1202 is 6 bits shorter than the partial bandwidth information subfield 1102, the Nc subfield 1203 can be extended by 1 bit over the Nc subfield 1106 without exceeding the bit budget (4 octets) of the STA information field 1100. With reference for example to FIG. 11A, the partial bandwidth information subfield 1202 and Nc subfield 1203 may replace the partial bandwidth information subfield 1102 of the STA information field 1100 with 2 remaining unused (or reserved) bits to spare. Further, the example format of the STA information field 1200 leaves an additional 3 unused (or reserved) bits such as shown, for example, at the end of the STA information field 1200.

Figure 12B:
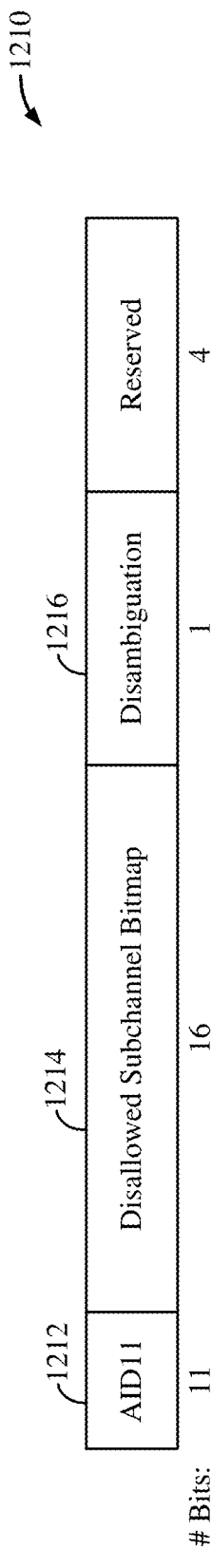
FIG. 12B shows another example format of a STA information field for an enhanced NDPA frame according to some implementations.

FIG. 12B shows another example format of a STA information field 1210 for an enhanced NPDA frame according to some implementations. In some implementations, the STA information field 1210 may be an example of one of the STA information fields 1030, of FIG. 10, when the NDPA frame 1000 is configured in accordance with the non-legacy NDPA frame format. More specifically, the example STA information field 1210 represents a second format of a STA information field capable of supporting the enhanced features of the IEEE 802.11be amendment, and future generations, of the IEEE 802.11 standard.

In the example of FIG. 12B, the STA information field 1210 includes an AID11 subfield 1212, a disallowed subchannel bitmap subfield 1214, and a disambiguation subfield 1216. With reference for example to FIG. 11B, the format of the STA information field 1210 substantially tracks the format of the STA information field 1110. In particular, the AID11 subfield 1212 and the disambiguation subfield 1216 may be substantially similar, if not identical, to the AID11 subfield 1112 and the disambiguation subfield 1116, respectively, of the STA information field 1110. Thus, the value of the AID11 subfield 1112 may be equal to a special AID value that is not assigned to any STAs in the BSS. In some aspects, the special AID value may be equal to 2047 (similar to the special AID value defined by the legacy NDPA frame format).

The disallowed subchannel bitmap subfield 1214 carries puncturing information identifying punctured subchannels associated with the bandwidth for the sounding feedback, similar to the disallowed subchannel bitmap subfield 1114 of the STA information field 1110. However, in some implementations, the disallowed subchannel bitmap subfield 1214 may be substantially longer than the disallowed subchannel bitmap subfield 1114. For example, as shown in FIG. 12B, the disallowed subchannel bitmap subfield 1214 spans 16 bits, whereas the disallowed subchannel bitmap subfield 1114 spans 8 bits. Aspects of the present disclosure recognize that the IEEE 802.11be amendment of the IEEE 802.11 standard supports wireless communications over bandwidths of up to 320 MHz. In contrast, the IEEE 802.11ax amendment of the IEEE 802.11 standard only supports wireless communications over bandwidths of up to 160 MHz. While 8 bits can sufficiently describe all possible punctured subchannels of a 160 MHz channel (with a 20 MHz puncturing granularity), at least 16 bits are needed to describe all possible punctured subchannels of a 320 MHz channel. Thus, in some aspects, each bit of the disallowed subchannel bitmap subfield 1214 may indicate whether puncturing is performed on a respective 20 MHz subchannel of a 320 MHz channel.

With reference for example to FIG. 11B, the STA information field 1110 includes 8 reserved bits immediately following the disallowed subchannel bitmap 1114. In some aspects, these reserved bits may be used to extend the disallowed subchannel bitmap subfield 1214 by 8 bits over the disallowed subchannel bitmap 114 without exceeding the bit budget (4 octets) of the STA information field 1100. For example, the disallowed subchannel bitmap subfield 1214 may replace the disallowed subchannel bitmap subfield 1114 of the STA information field 1110 as well as the 8 reserved bits immediately following the disallowed subchannel bitmap subfield 1114. Further, the example format of the STA information field 1210 leaves an additional 4 unused (or reserved) bits such as shown, for example, at the end of the STA information field 1210. In some implementations, one or more of these reserved bits may be used to indicate another format of a STA information field which supports multi-AP sounding.

Figure 13:
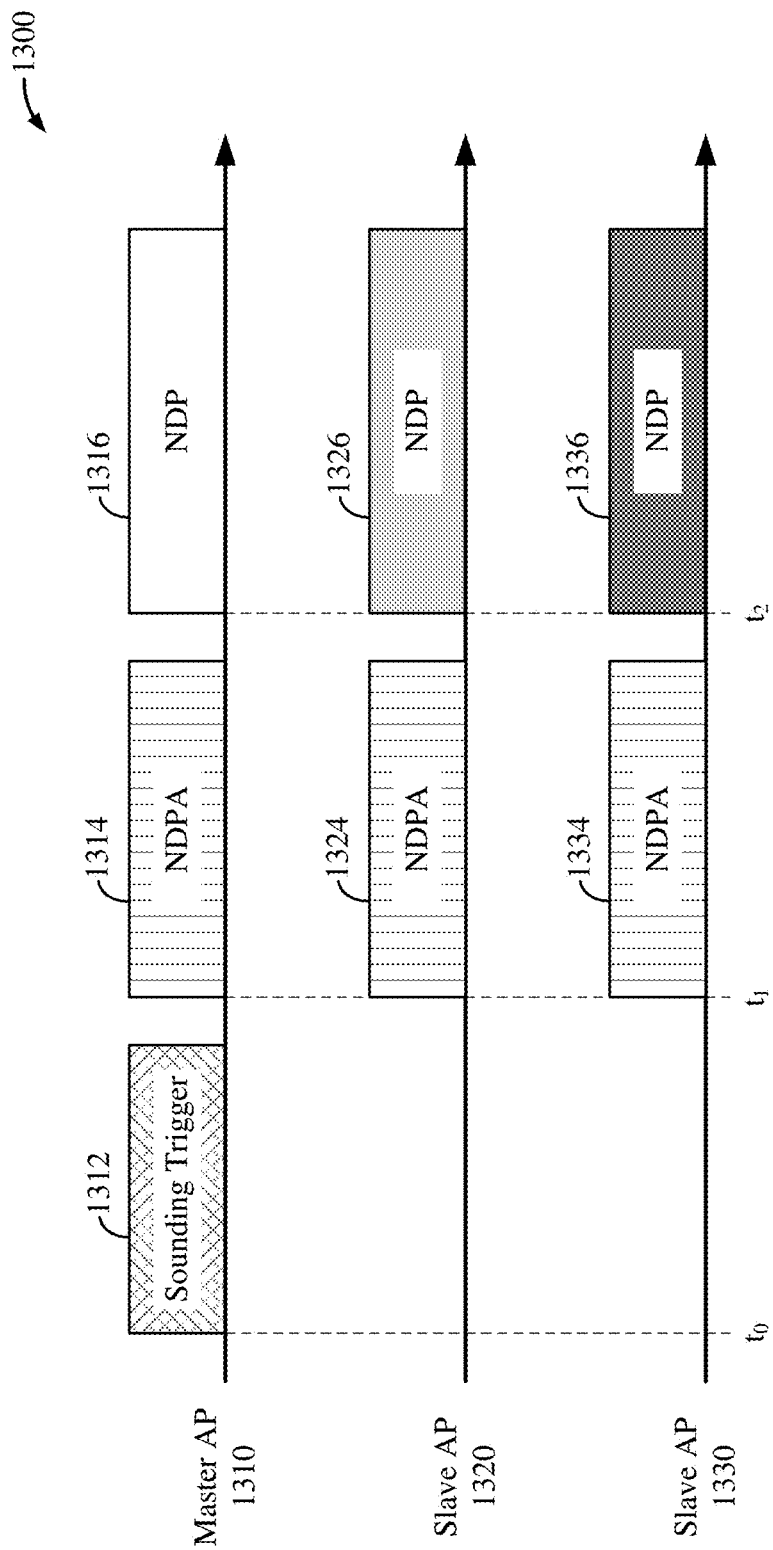
FIG. 13 shows a timing diagram depicting an example multi-AP sounding operation according to some implementations.

FIG. 13 shows a timing diagram 1300 depicting an example multi-AP sounding operation according to some implementations. In some implementations, the example operation 1300 may be performed by multiple APs 1310, 1320, and 1330 belonging to overlapping BSSs (OBSSs). Each of the APs 1310, 1302, and 1330 may be one example of the APs 102 or 502 of FIGS. 1 and 5A, respectively. Although 3 APs are depicted in FIG. 13, the multi-AP sounding operation may be performed with 2 or more APs in other implementations.

In a multi-AP sounding operation, multiple APs transmit sounding packets, concurrently, over a shared wireless medium. To synchronize the transmissions of multiple sounding packets, one of the APs is assigned the role of a master AP and the remaining APs are assigned the roles of slave APs. In the example of FIG. 13, AP 1310 is assigned the role of a master AP and each of the remaining APs 1320 and 1330 is assigned the role of a slave AP. At time to, the master AP 1310 transmits a sounding trigger frame 1312 to the slave APs 1320 and 1330. In some implementations, the sounding trigger frame 1312 may signal the start of a multi-AP sounding operation. In the example of FIG. 13, the sounding trigger frame 1312 may signal that a multi-AP sounding operation is to begin at time $t_1$. Thus, at time $t_1$, the APs 1310, 1320, and 1330 may transmit NDPA frames 1314, 1324, and 1334, respectively, to their associated STAs. For example, each of the NDPA frames 1314, 1324, and 1334 may be transmitted on a different subchannel of a shared wireless channel. Then, at time $t_2$ (which may occur a short interframe space (SIFS) duration after time $t_1$), the APs 1310, 1320, and 1330 may transmit NDPs 1316, 1326, and 1336, respectively, to their associated STAs.

The NDPs 1316, 1326, and 1336 transmitted by the APs 1310, 1320, and 1330, respectively, may be different or unique. For example, each of the NDPs 1316, 1326, and 1336 may carry information that is specific to the STAs belonging to a particular BSS. However, in some implementations, the APs 1310, 1320, and 1330 may transmit identical NDPA frames 1314, 1324, and 1334, respectively. In other words, each of the NDPA frames 1314, 1324, and 1334 may identify every STA of every BSS involved in the multi-AP sounding operation. As described above, each STA belonging to a given BSS may be uniquely identified in that BSS by a respective AID value. However, aspects of the present disclosure recognize that AID values may be reused across different BSSs. For example, the master AP 1310 may assign a particular AID value to a STA in its BSS while the slave AP 1320 may assign the same AID value to a STA in its own BSS. Thus, the AID values may not be sufficient to uniquely identify STAs belonging to different BSSs. In some implementations, each of the NDPA frames 1314, 1324, and 1334 may carry additional information that can be used to further differentiate STAs belonging to different BSSs.

Figure 14:
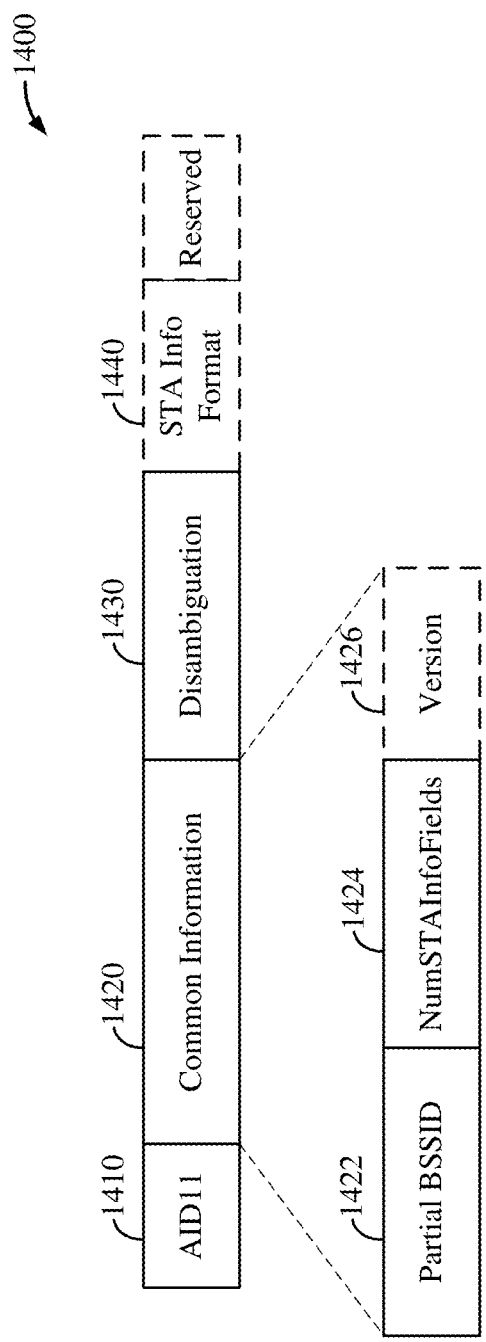
FIG. 14 shows an example format of a STA information field for an enhanced NDPA frame according to some implementations.

FIG. 14 shows an example format of a STA information field 1400 for an enhanced NDPA frame according to some implementations. In some implementations, the STA information field 1400 may be an example of one of the STA information fields 1030, of FIG. 10, when the NDPA frame 1000 is configured in accordance with the non-legacy NDPA frame format. More specifically, the example STA information field 1210 represents a third format of a STA information field capable of supporting the enhanced features of the IEEE 802.11be amendment, and future generations, of the IEEE 802.11 standard.

In the example of FIG. 14, the STA information field 1400 includes an AID11 subfield 1410, a common information subfield 1420, and a disambiguation subfield 1430. In some implementations, the format of the STA information field 1400 may be identified based on the value of the AID11 subfield 1410. Thus, in some aspects, the AID11 subfield 1410 may be assigned a special AID value that is not assigned to any STAs in the BSS and is also different than the special AID value used to identify the format of the STA information field 1210 of FIG. 12B. In other words, the value of the AID11 subfield 1410 may not be equal to 2047. In some other implementations, the STA information field 1400 may include a separate STA information format subfield 1440 carrying information indicating the format of the STA information field 1400. In such implementations, the AID11 subfield 1410 may be assigned the same special AID value used to identify the format of the STA information field 1210 (such as 2047). With reference for example to FIG. 11B, the STA information format subfield 1440 may replace one or more reserved bits of the STA information field 1110.

In some implementations, the common information subfield 1420 may carry information that is common to, or shared by, one or more additional STA information fields of a corresponding NDPA frame. In some implementations, the common information subfield 1420 may include a partial BSS identifier (BSSID) subfield 1422 and a number of STA information fields (NumSTAInfoFields) subfield 1424. The partial BSSID subfield 1422 may carry information identifying a particular BSS such as, for example, a BSS participating in a multi-AP sounding operation. Aspects of the present disclosure recognize that a BSSID (48 bits) may be too long to include, in its entirety, in a STA information field (which is limited to 32 bits). In some implementations, the information in the partial BSSID subfield 1422 may be a shortened or alternative representation of a BSSID. For example, in some aspects, the information in the partial BSSID subfield 1422 may include BSS color information (6 bits) plus a number (such as 5) randomly-generated bits. In some other aspects, the information in the partial BSSID subfield 1422 may include the BSS color information plus a number (such as 5) bits representing a group ID. For example, the group ID may be assigned manually or by a network controller.

The NumSTAInfoFields subfield 1424 carries information indicating a number (n) of subsequent STA information fields (immediately following the STA information field 1400) to which the partial BSSID subfield 1422 applies. For example, if the value of the NumSTAInfoFields subfield 1424 is equal to 5 (n=5), then the information in the BSSID subfield 1422 is applicable to the next 5 STA information fields immediately following the STA information field 1400. Each of the n subsequent STA information fields may be associated with a respective STA belonging to the BSS identified by the partial BSSID subfield 1422. For example, the n subsequent STA information field may be of the first format described above with reference to FIG. 12A. Accordingly, each of the STAs associated with the n subsequent STA information fields may be uniquely identified based on the information in the partial BSSID subfield 1422 and the value of the AID11 subfield of its respective STA information field. Thus, the information in the partial BSSID subfield 1422 may further differentiate STAs across different BSSs, for example, when performing multi-AP sounding operation (such as described with reference to FIG. 13).

Aspects of the present disclosure recognize that, in some instances, the same partial BSSID information may be assigned to multiple BSSs or APs. Accordingly, a mechanism may be needed to resolve such partial BSSID collisions. As described above with reference to FIG. 13, an identical NDPA frame is transmitted by each AP participating in a multi-AP sounding operation is identical. Thus, in some implementations, wireless communication devices (such as APs and STAs) may monitor NDPA frames for partial BSSID collisions. If a wireless communication device detects that two or more BSSs are represented by the same partial BSSID information, it may notify one of the APs associated with the partial BSSID information to change its partial BSSID information. In some implementations, the partial BSSID information is derived from the BSS color of a given BSS. Thus, in some aspects, when a wireless communication device detects that two or more BSSs are represented by the same partial BSSID information, it may notify one of the APs associated with the partial BSSID information to change its BSS color.

In some implementations, the common information subfield 1420 may further include a version subfield 1426. The version subfield 1426 may carry information indicating a version of the non-legacy NDPA frame format associated with the common information subfield 1420. For example, some enhanced wireless communication features (such as puncturing for a 320 MHz channel) may be available in a first revision (R1) of the IEEE 802.11be amendment of the IEEE 802.11 whereas some other features (such as multi-AP sounding) may only be available in a later revision (R2) of the 802.11be amendment. Accordingly, some STAs that are configured to operate in accordance with the first revision of the IEEE 80.211be amendment may not support any of the R2 features. Such STAs may determine, based on the information in version subfield 1426, that they do not support the features related to multi-AP sounding (such as provided in the partial BSSID subfield 1422 and the NumSTAInfoFields subfield 1424). In some aspects, such STAs may stop processing the STA information field 1400, or the NDPA frame, upon determining that the features related to the common information subfield 1420 are unsupported. Accordingly, the information in the version subfield 1426 may be used to determine the types of information carried in other subfields of the common information subfield 1420.

As described above, a sounding operation involves a transmission of an NDPA frame followed immediately by a transmission of an NDP. The NDPA frame is a control frame which is used to indicate, to one or more STAs, a request for sounding feedback. In contrast, the NDP may be a PPDU (with no data portion) which is used by the one or more STAs to estimate the conditions of the wireless channel. In some implementations, the type of PPDU transmitted as the NDP may depend on the format of the NDPA frame. For example, if an AP transmits an NDPA frame configured in accordance with the legacy NDPA frame format, the AP may subsequently transmit an NDP based on the legacy SU PPDU format (referred to herein as a "legacy NDP"). On the other hand, if an AP transmits an NDPA frame configured in accordance with the non-legacy NDPA frame format, the AP may subsequently transmit an NDP based on a non-legacy PPDU format (referred to herein as a "non-legacy NDP").

With reference for example to FIG. 6, EHT-STF 622 may follow immediately after EHT-SIG 618 in the non-legacy PPDU 600. However, aspects of the present disclosure recognize that EHT-SIG may not be present in some PPDU formats (such as the TB PPDU 700 of FIG. 7A). The presence of EHT-SIG (or lack thereof) may affect the timing of one or more subsequent fields of a non-legacy PPDU. For example, EHT-STF may be used by the receiving STA to perform automatic gain control (AGC) in the receiver. More specifically, the receiving STA may use the EHT-STF to reconfigure its receiver to receive the EHT portion of a non-legacy PPDU. Thus, it is desirable for the receiving device to detect EHT-STF early such that a substantial portion of EHT-STF can be used for AGC. Aspects of the present disclosure recognize that EHT-SIG provides a buffer between U-SIG and EHT-STF during which the receiving STA may be configured to detect EHT-STF. Because the accuracy of a channel estimate may depend on early detection of EHT-STF, it may be desirable to design a non-legacy NDP based on a non-legacy PPDU format which includes at least one EHT-SIG symbol.

Figure 15:
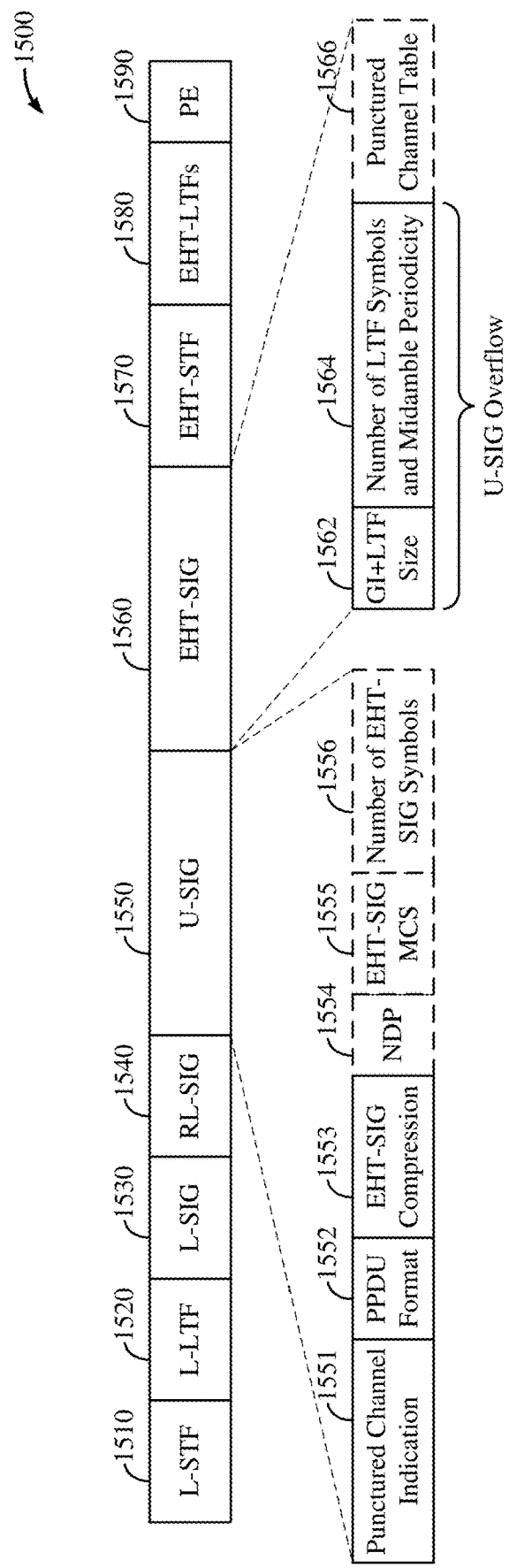
FIG. 15 shows an example frame structure of a PPDU formatted as a null data packet (NDP) according to some implementations.

FIG. 15 shows an example frame structure of a PPDU 1500 formatted as an NDP according to some implementations. In some implementations, the frame structure of the PPDU 1500 may be based on the unified PPDU format described above with reference to FIG. 8. The PPDU 1500 includes an L-STF 1510, an L-LTF 1520, an L-SIG 1530, an RL-SIG 1540, a U-SIG 1550, an EHT-SIG 1560, an EHT-STF 1570, one or more EHT-LTFs 1580, and a PE 1590. With reference for example to FIG. 8, L-STF 1510, L-LTF 1520, L-SIG 1530, RL-SIG 1540, U-SIG 1550, and EHT-SIG 1560 may correspond to L-STF 801, L-LTF 802, L-SIG 803, RL-SIG 804, U-SIG 805, and EHT-SIG 806, respectively, of the unified PPDU 800.

In the example of FIG. 15, U-SIG 1550 includes a punctured channel indication field 1551, a PPDU format field 1552, and an EHT-SIG compression field 1553. The punctured channel indication field 1551 may carry bandwidth puncturing information indicating which (if any) subchannels associated with a bandwidth of the PPDU 1500 are punctured. In some aspects, the bandwidth puncturing information in the punctured channel indication field 1551 may represent only "partial" bandwidth puncturing information. The value of the PPDU format field 1552 may indicate a general PPDU format for the PPDU 1500 (such as described with reference to FIG. 6). Further, the value of the EHT-SIG compression field 1553 may indicate a compression mode of the PPDU 1500 (such as described with reference to FIG. 8).

In some implementations, the PPDU 1500 may be identified as an NDP based on the information in the PPDU format field 1552. For example, the PPDU format field 1552 may carry 2 bits of information which can be used to represent up to 4 different PPDU formats. However, as shown in FIG. 7A-7C, existing versions of the IEEE 802.11be amendment of the IEEE 802.11 standard may only support 3 general PPDU formats (including TB, SU, and MU PPDU formats) that can be represented by the PPDU format field 1552. Thus, aspects of the present disclosure recognize that the information in the PPDU format field 1552 may be further used to represent a fourth, "NDP" format.

In some other implementations, the PPDU 1500 may be identified as an NDP based on the information in the EHT-SIG compression field 1553. For example, the EHT-SIG compression field 1553 may carry 2 bits of information which can be used to represent up to 4 different compression modes. However, as described with reference to FIG. 8, existing versions of the IEEE 802.11be amendment of the IEEE 802.11 standard may only support 3 different compression modes (including full bandwidth SU or MU-MIMO, punctured SU or MU-MIMO, and OFDMA modes). Thus, aspects of the present disclosure recognize that the information in the EHT-SIG compression field 1553 may be further used to represent a fourth, "NDP" mode.

Still further, in some implementations, the PPDU 1500 may be identified as an NDP based on information carried in L-SIG 1530 or RL-SIG 1540 and a number of EHT-LTFs 1580 in the PPDU 1500. For example, L-SIG 1530 (and RL-SIG 1540, which is a repeat of L-SIG 1530) may include a length field (L_LEN) indicating a length of the PPDU 1500. The number of EHT-LTF symbols may be indicated in a number of LTF symbols and midamble periodicity field included in U-SIG or EHT-SIG (as U-SIG overflow). Aspects of the present disclosure recognize that, because the PPDU 1500 does not include a data portion, the PPDU 1500 terminates shortly after transmission of the EHT-LTFs 1580 (such as immediately after the PE field 1590). Accordingly, a receiving STA may detect the absence of the data portion, and thus identify the PPDU 1500 as an NDP, based on the length of the PPDU 1500 and the number of EHT-LTFs 1580.

In the example of FIG. 15, EHT-SIG 1560 includes a guard interval and LTF (GI+LTF) size field 1562 and a number of LTF symbols and midamble periodicity field 1564. The value of the GI+LTF size field 1562 indicates a guard interval (GI) duration and a size of the EHT-LTFs in the PPDU 1500. The value of the number of LTF symbols and midamble periodicity field 1564 indicates a number of EHT-LTF symbols and a frequency with which midambles are inserted in the PPDU 1500. In some implementations, the value of the number of LTF symbols and midamble periodicity field 1564 also may indicate the number of space-time streams ($N_{STS}$) on which the PPDU 1500 is transmitted. In some aspects, the GI+LTF size field 1562 and the number of LTF symbols and midamble periodicity field 1564 may be overflowed from U-SIG 1550. Accordingly, the length of EHT-SIG 1560 may span at least 2 symbol durations (when transmitted at MCS0).

In some implementations, EHT-SIG 1560 may be signaled on 2 different content channels (CC1 and CC2). Thus, although not shown for simplicity, EHT-SIG 1560 may further include a respective field for each content channel indicating the number of users associated with that content channel. However, because an NDP does not carry any user data, EHT-SIG 1560 may not include any user fields. Thus, in some aspects, the number of users associated with the first content channel CC1 may be equal to 1 and the number of users associated with the second content channel CC2 may be equal to 0. In some implementations, EHT-SIG 1560 may further include a punctured channel table 1566 carrying additional bandwidth puncturing information indicating which (if any) subchannels associated with a bandwidth of the PPDU 1500 are punctured. In some aspects, the bandwidth puncturing information in the EHT-SIG 1560 may represent "full" bandwidth puncturing information.

Table 1, below, shows a more detailed representation of the fields of the PPDU 1500. As shown in Table 1 several fields of the unified PPDU format may be not applicable (NA) or otherwise left unused in the PPDU 1500. In some implementations, one or more unused fields (including any fields labeled NA or Reserved) may be replaced or repurposed to carry additional signaling for the PPDU 1500. For example, in some aspects, U-SIG 1550 may further include an NDP field 1554 carrying information which explicitly indicates whether the PPDU 1500 is an NDP. In some other aspects, a specific combination of values for the EHT-SIG MCS field 1555 and the number of EHT-SIG symbols field 1556 may be used to indicate that the PPDU 1500 is an NDP. For example, the PPDU 1500 may be identified as an NDP when the value of the EHT-SIG MCS field 155 is set to 0 and the value of the number of EHT-SIG symbols field 1556 is set to 1.

TABLE 1

| Field | Category | Subfield | # Bits |
|---|---|---|---|
| U-SIG | Version Independent (Universal) | Version Identifier | 3 |
| | | UL/DL | 1 |
| | | BSS Color | 6 |
| | | TXOP | 7 |
| | | PPDU BW | 3 |
| | | Punctured Channel Indication | 4 |
| | Version Dependent | PPDU Format | 2 |
| | | Reserved | 1 |
| | | Non-DUPed/2x DUPed | NA |

TABLE 1-continued

| Field | Category | Subfield | # Bits |
|---|---|---|---|
| | | EHT-SIG MCS | NA |
| | | Number of EHT-SIG Symbols | NA |
| | | EHT-SIG Compression | 2 |
| | | Reserved | 4 |
| | CRC & Tail | CRC in U-SIG | 4 |
| | | Tail in U-SIG | 6 |
| | | Total # Bits in U-SIG | 52 |
| EHT-SIG | Version Dependent (U-SIG Overflow) | Spatial Reuse | NA |
| | | GI + LTF Size | 3 |
| | | Doppler | NA |
| | | Number of LTF Symbols and Midamble Periodicity | 3 |
| | | LDPC Extra Symbol Segment | NA |
| | | STBC | NA |
| | | Pre-FEC Padding Factor | NA |
| | | PE Disambiguity | NA |
| | | Total # Overflow Bits | 16 |

In some implementations, one or more unused fields in U-SIG 1550 may be repurposed to carry information from one or more fields that would otherwise be included in EHT-SIG 1560 (such as U-SIG overflow). As a result, the length of EHT-SIG 1560 may be further reduced.

Figure 16:
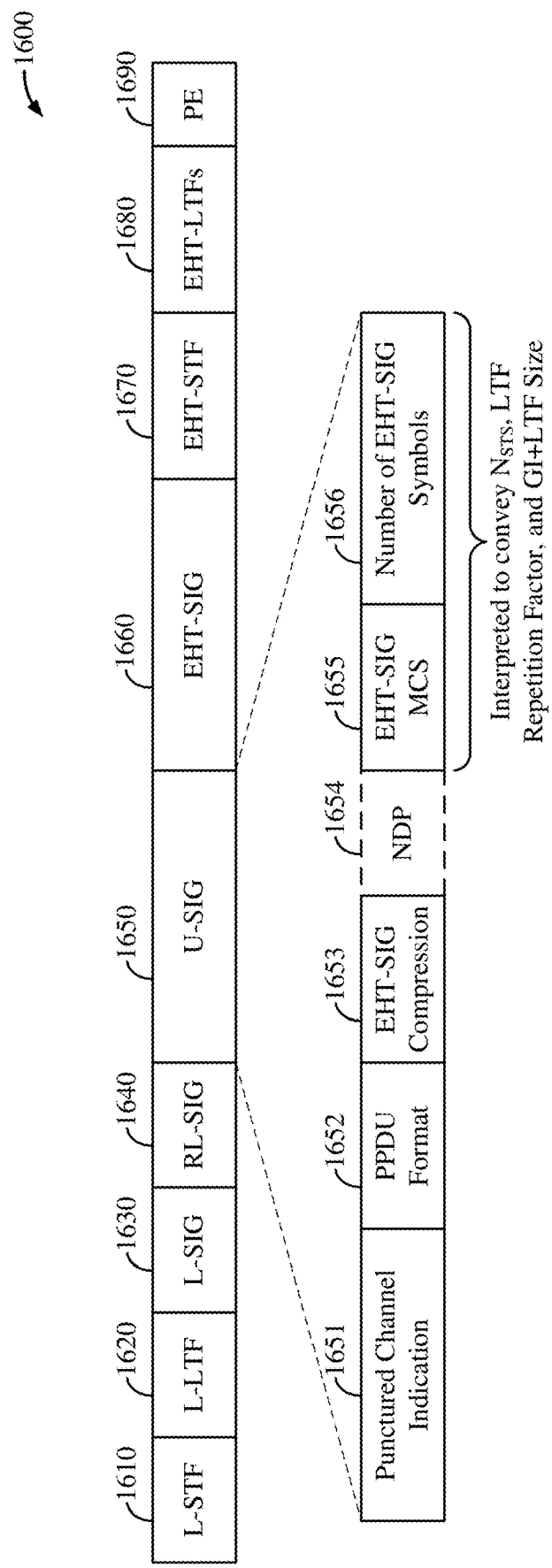
FIG. 16 shows another example frame structure of a PPDU formatted as an NDP according to some implementations.

FIG. 16 shows another example frame structure of a PPDU 1600 formatted as an NDP according to some implementations. In some implementations, the frame structure of the PPDU 1600 may be based on the unified PPDU format described above with reference to FIG. 8. The PPDU 1600 includes an L-STF 1610, an L-LTF 1620, an L-SIG 1630, an RL-SIG 1640, a U-SIG 1650, an EHT-SIG 1660, an EHT-STF 1670, one or more EHT-LTFs 1680, and a PE 1690. With reference for example to FIG. 8, L-STF 1610, L-LTF 1620, L-SIG 1630, RL-SIG 1640, U-SIG 1650, and EHT-SIG 1660 may correspond to L-STF 801, L-LTF 802, L-SIG 803, RL-SIG 804, U-SIG 805, and EHT-SIG 806, respectively, of the unified PPDU 800.

In the example of FIG. 16, U-SIG 1650 includes a punctured channel indication field 1651, a PPDU format field 1652, an EHT-SIG compression field 1653, an EHT-SIG MCS field 1655, and a number of EHT-SIG symbols field 1656. The punctured channel indication field 1651 may carry bandwidth puncturing information indicating which (if any) subchannels associated with a bandwidth of the PPDU 1600 are punctured. In some aspects, the bandwidth puncturing information in the punctured channel indication field 1651 may represent partial bandwidth puncturing information. The value of the PPDU format field 1652 may indicate a general PPDU format for the PPDU 1600 (such as described with reference to FIG. 6). Further, the value of the EHT-SIG compression field 1653 may indicate a compression mode of the PPDU 1600 (such as described with reference to FIG. 8).

In some implementations, the PPDU 1600 may be identified as an NDP based on the information in the PPDU format field 1652. For example, the PPDU format field 1652 may carry 2 bits of information which can be used to represent up to 4 different PPDU formats. However, as shown in FIG. 7A-7C, existing versions of the IEEE 802.11be amendment of the IEEE 802.11 standard may only support 3 general PPDU formats (including TB, SU, and MU PPDU formats) that can be represented by the PPDU format field 1652. Thus, aspects of the present disclosure recognize that the information in the PPDU format field 1652 may be further used to represent a fourth, "NDP" format.

In some other implementations, the PPDU 1600 may be identified as an NDP based on the information in the EHT-SIG compression field 1653. For example, the EHT-SIG compression field 1653 may carry 2 bits of information which can be used to represent up to 4 different compression modes. However, as described with reference to FIG. 8, existing versions of the IEEE 802.11be amendment of the IEEE 802.11 standard may only support 3 different compression modes (including full bandwidth SU or MU-MIMO, punctured SU or MU-MIMO, and OFDMA modes). Thus, aspects of the present disclosure recognize that the information in the EHT-SIG compression field 1653 may be further used to represent a fourth, "NDP" mode.

Still further, in some implementations, the PPDU 1600 may be identified as an NDP based on information carried in L-SIG 1630 or RL-SIG 1640 and a number of EHT-LTFs 1680 in the PPDU 1600. For example, L-SIG 1630 (and RL-SIG 1640, which is a repeat of L-SIG 1630) may include a length field (L_LEN) indicating a length of the PPDU 1600. The number of EHT-LTF symbols may be indicated in a number of LTF symbols and midamble periodicity field included in U-SIG or EHT-SIG (as U-SIG overflow). Aspects of the present disclosure recognize that, because the PPDU 1600 does not include a data portion, the PPDU 1600 terminates shortly after transmission of the EHT-LTFs 1680 (such as immediately after the PE field 1690). Accordingly, a receiving STA may detect the absence of the data portion, and thus identify the PPDU 1600 as an NDP, based on the length of the PPDU 1600 and the number of EHT-LTFs 1680.

In the example of FIG. 16, information in the EHT-SIG MCS field 1655 and the number of EHT-SIG symbols field 1656 may be reinterpreted to convey a number of space-time streams ($N_{STS}$), an LTF repetition factor, and a GI and LTF size. In other words, with reference to FIG. 15, information that would otherwise be carried in EHT-SIG 1560 of the PPDU 1500 (specifically, in the GI+LTF size field 1562 and the number of LTF symbols and midamble periodicity field 1564) is instead carried in U-SIG 1650 of the PPDU 1600. This reduces the overhead, and thus length, of EHT-SIG 1660. For example, in some aspects, EHT-SIG 1660 may not carry any U-SIG overflow bits. Accordingly, the length of EHT-SIG 1660 may span only 1 symbol duration (when transmitted at MCS0).

As described above, because an NDP does not carry any user data, EHT-SIG 1660 may not include any user fields. Further, EHT-SIG 1660 may not be signaled on multiple content channels. Thus, EHT-SIG 1660 may not include any content channel fields (such as described with reference to FIG. 15). In some implementations, EHT-SIG 1660 may further include a punctured channel table (not shown) carrying additional bandwidth puncturing information indicating which (if any) subchannels associated with a bandwidth of the PPDU 1600 are punctured. In some aspects, the bandwidth puncturing information in the EHT-SIG 1660 may represent full bandwidth puncturing information.

Table 2, below, shows a more detailed representation of the fields of the PPDU 1500. In contrast with Table 1, each of the U-SIG overflow fields may be left unused in EHT-SIG 1660. As Table 2 further shows, the information conveying the number of space-time streams (4 bits), the LTF repetition factor (2 bits), and a GI and LTF size (1-2 bits) may fit within the bit budget of EHT-SIG MCS field 1655 (3 bits) and the number of EHT-SIG symbols field 1656 (5 bits). Even with the repurposed bits, U-SIG 1650 still may still include some fields that are not applicable (NA) or otherwise left unused. In some implementations, one or more unused fields (including any fields labeled NA or Reserved) may be replaced or repurposed to carry additional signaling for the PPDU 1600. For example, in some aspects, U-SIG 1650 may further include an NDP field 1654 carrying information which explicitly indicates whether the PPDU 1600 is an NDP.

TABLE 2

| Field | Category | Subfield | # Bits |
| --- | --- | --- | --- |
| U-SIG | Version Independent (Universal) | Version Identifier | 3 |
| | | UL/DL | 1 |
| | | BSS Color | 6 |
| | | TXOP | 7 |
| | | PPDU BW | 3 |
| | | Punctured Channel Indication | 4 |
| | Version Dependent | PPDU Format | 2 |
| | | Reserved | 1 |
| | | Non-DUPed/2x DUPed | NA |
| | | EHT-SIG MCS | 3 |
| | | Number of EHT-SIG Symbols | 5 |
| | | EHT-SIG Compression | 2 |
| | | Reserved | 4 |
| | CRC & Tail | CRC in U-SIG | 4 |
| | | Tail in U-SIG | 6 |
| | | Total # Bits in U-SIG | 52 |
| EHT-SIG | Version Dependent (U-SIG Overflow) | Spatial Reuse | NA |
| | | GI + LTF Size | NA |
| | | Doppler | NA |
| | | Number of LTF Symbols and Midamble Periodicity | NA |
| | | LDPC Extra Symbol Segment | NA |
| | | STBC | NA |
| | | Pre-FEC Padding Factor | NA |
| | | PE Disambiguity | NA |
| | | Total # Overflow Bits | 16 |

Figure 17:
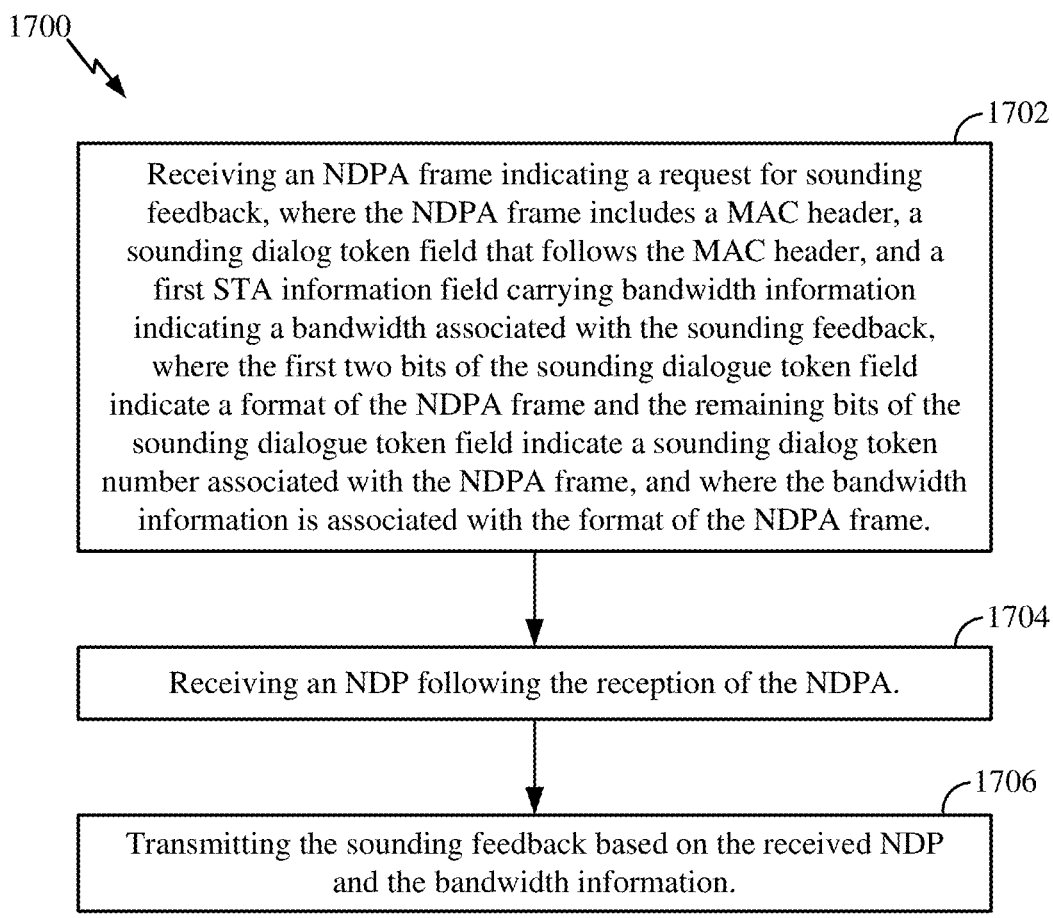
FIG. 17 shows a flowchart illustrating an example process for wireless communication that supports enhanced sounding packet designs according to some implementations.

FIG. 17 shows a flowchart illustrating an example process 1700 for wireless communication that supports enhanced sounding packet designs according to some implementations. In some implementations, the process 1700 may be performed by a wireless communication device operating as or within a STA such as one of the STAs 104 or 504 of FIGS. 1 and 5B, respectively. In some other implementations, the process 1700 may be performed by a wireless communication device operating as or within an AP such as one of the APs 102 or 502 of FIGS. 1 and 5A, respectively.

In some implementations, the process 1700 begins in block 1702 by receiving an NDPA frame indicating a request for sounding feedback, where the NDPA frame includes a MAC header, a sounding dialog token field that follows the MAC header, and a first STA information field carrying bandwidth information indicating a bandwidth associated with the sounding feedback, where the first two bits of the sounding dialogue token field indicate a format of the NDPA frame and the remaining bits of the sounding dialogue token field indicate a sounding dialog token number associated with the NDPA frame, and where the bandwidth information is associated with the format of the NDPA frame. In block 1704, the process 1700 proceeds with receiving an NDP following the reception of the NDPA. In block 1706, the process 1700 proceeds with transmitting the sounding feedback based on the received NDP and the bandwidth information.

In some aspects, each of the first two bits of the sounding dialogue token field may have a value equal to 1. In some implementations, the bandwidth information may be carried in a partial bandwidth information subfield that is less than 14 bits in length. In some implementations, the first STA information field may include one or more reserved bits. In some implementations, the first STA information field may include an Nc subfield that is 4 bits in length. In some implementations, the Nc subfield may indicate a number of spatial streams or a number of columns of a feedback matrix to be included in the sounding feedback. In some implementations, the first STA information field may include an AID subfield having a special AID value that is not assigned to any STAs associated with the same BSS as the wireless communication device. In some implementations, the first STA information field may further include a partial BSSID subfield having a value associated with the BSS and a NumSTAInfoFields subfield indicating a number (N) of STA information fields following the first STA information field, where each of the N STA information fields is identified based on a respective AID value and the value indicated by the partial BSSID subfield.

In some aspects, the NDP may be a PPDU having a physical layer preamble that includes an L-SIG, an RL-SIG that follows L-SIG, and a U-SIG that follows RL-SIG and carries information indicating that the PPDU is an NDP. In some implementations, the information carried in U-SIG may include compression mode information indicating a compression mode associated with an MU PPDU format. In some implementations, the physical layer preamble may further include an EHT-SIG that follows U-SIG, where EHT-SIG includes a common field and zero user fields. In some implementations, the information carried in U-SIG may include a value of an EHT-SIG MCS field indicating an MCS associated with EHT-SIG and may include a value of a number of EHT-SIG symbols field indicating a number of symbols associated with EHT-SIG. In some implementations, the value of the EHT-SIG MCS field may indicate MCS0 and the value of the number of EHT-SIG symbols field may indicate 1 EHT-SIG symbol.

Figure 18:
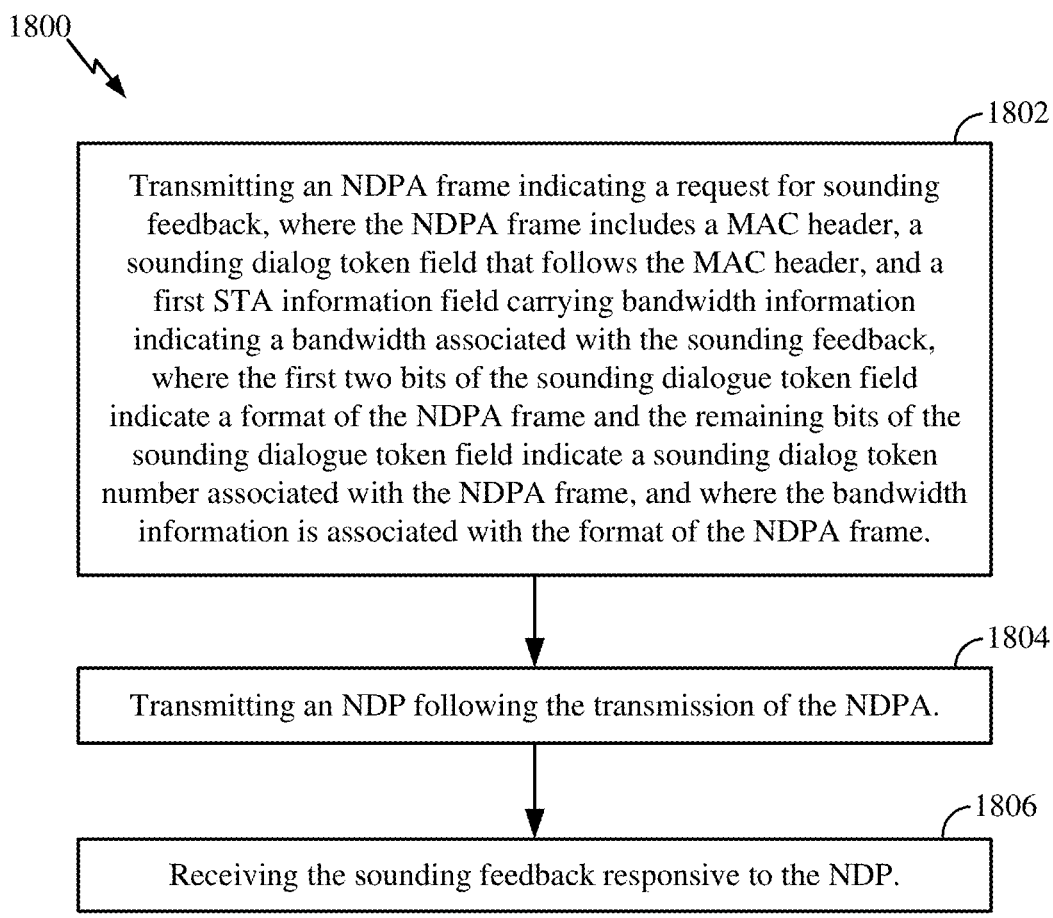
FIG. 18 shows a flowchart illustrating an example process for wireless communication that supports enhanced sounding packet designs according to some implementations.

FIG. 18 shows a flowchart illustrating an example process 1800 for wireless communication that supports enhanced sounding packet designs according to some implementations. In some implementations, the process 1800 may be performed by a wireless communication device operating as or within a STA such as one of the STAs 104 or 504 of FIGS. 1 and 5B, respectively. In some other implementations, the process 1800 may be performed by a wireless communication device operating as or within an AP such as one of the APs 102 or 502 of FIGS. 1 and 5A, respectively.

In some implementations, the process 1800 begins in block 1802 by transmitting an NDPA frame indicating a request for sounding feedback, where the NDPA frame includes a MAC header, a sounding dialog token field that follows the MAC header, and a first STA information field carrying bandwidth information indicating a bandwidth associated with the sounding feedback, where the first two bits of the sounding dialogue token field indicate a format of the NDPA frame and the remaining bits of the sounding dialogue token field indicate a sounding dialog token number associated with the NDPA frame, and where the bandwidth information is associated with the format of the NDPA frame. In block 1804, the process 1800 proceeds with transmitting an NDP following the transmission of the NDPA. In block 1806, the process proceeds with receiving the sounding feedback responsive to the NDP.

In some aspects, each of the first two bits of the sounding dialogue token field may have a value equal to 1. In some implementations, the bandwidth information may be carried in a partial bandwidth information subfield that is less than 14 bits in length. In some implementations, the first STA information field may include one or more reserved bits. In some implementations, the first STA information field may include an Nc subfield that is 4 bits in length. In some implementations, the Nc subfield may indicate a number of spatial streams or a number of columns of a feedback matrix to be included in the sounding feedback. In some implementations, the first STA information field may include an AID subfield having a special AID value that is not assigned to any STAs associated with the same BSS as the wireless communication device. In some implementations, the first STA information field may further include a partial BSSID subfield having a value associated with the BSS and a NumSTAInfoFields subfield indicating a number (N) of STA information fields following the first STA information field, where each of the N STA information fields is identified based on a respective AID value and the value indicated by the partial BSSID subfield.

In some aspects, the NDP may be a PPDU having a physical layer preamble that includes an L-SIG, an RL-SIG that follows L-SIG, and a U-SIG that follows RL-SIG and carries information indicating that the PPDU is an NDP. In some implementations, the information carried in U-SIG may include compression mode information indicating a compression mode associated with an MU PPDU format. In some implementations, the physical layer preamble may further include an EHT-SIG that follows U-SIG, where EHT-SIG includes a common field and zero user fields. In some implementations, the information carried in U-SIG may include a value of an EHT-SIG MCS field indicating an MCS associated with EHT-SIG and may include a value of a number of EHT-SIG symbols field indicating a number of symbols associated with EHT-SIG. In some implementations, the value of the EHT-SIG MCS field may indicate MCS0 and the value of the number of EHT-SIG symbols field may indicate 1 EHT-SIG symbol.

Figure 19:
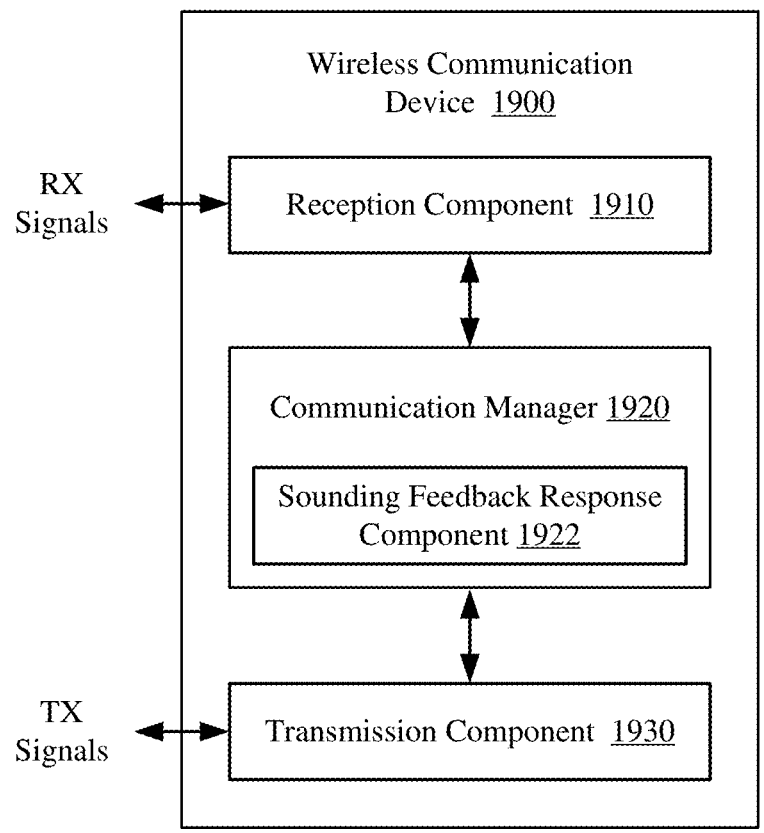
FIG. 19 shows a block diagram of an example wireless communication device according to some implementations.

FIG. 19 shows a block diagram of an example wireless communication device according to some implementations. In some implementations, the wireless communication device 1900 is configured to perform the process 1700 described above with reference to FIG. 17. In some implementations, the wireless communication device 1900 can be an example implementation of the wireless communication device 400 described above with reference to FIG. 4. For example, the wireless communication device 1900 can be a chip, SoC, chipset, package or device that includes at least one processor and at least one modem (for example, a Wi-Fi (IEEE 802.11) modem or a cellular modem).

The wireless communication device 1900 includes a reception component 1910, a communication manager 1920, and a transmission component 1930. The communication manager 1920 may further include a sounding feedback response component 1922. Portions of the sounding feedback response component 1922 may be implemented at least in part in hardware or firmware. In some implementations, the sounding feedback response component 1922 is implemented at least in part as software stored in a memory (such as the memory 408). For example, portions of the sounding feedback response component 1922 can be implemented as non-transitory instructions or code executable by a processor (such as the processor 406) to perform the functions or operations of the respective component.

The reception component 1910 is configured to receive RX signals from one or more other wireless communication devices and the transmission component 1930 is configured to transmit TX signals to one or more other wireless communication devices. In some implementations, the reception component 1910 may receive an NDPA frame indicating a request for sounding feedback, where the NDPA frame includes a MAC header, a sounding dialog token field that follows the MAC header, and a first STA information field carrying bandwidth information indicating a bandwidth associated with the sounding feedback, where the first two bits of the sounding dialogue token field indicate a format of the NDPA frame and the remaining bits of the sounding dialogue token field indicate a sounding dialog token number associated with the NDPA frame, and where the bandwidth information is associated with the format of the NDPA frame. In some implementations, the reception component 1910 may further receive an NDP following the reception of the NDPA. The communication manager 1920 is configured to manage communications between the wireless communication device 1900 and one or more other wireless communication devices. In some implementations, the sounding feedback response component 1922 may transmit the sounding feedback based on the received NDP and the bandwidth information.

Figure 20:
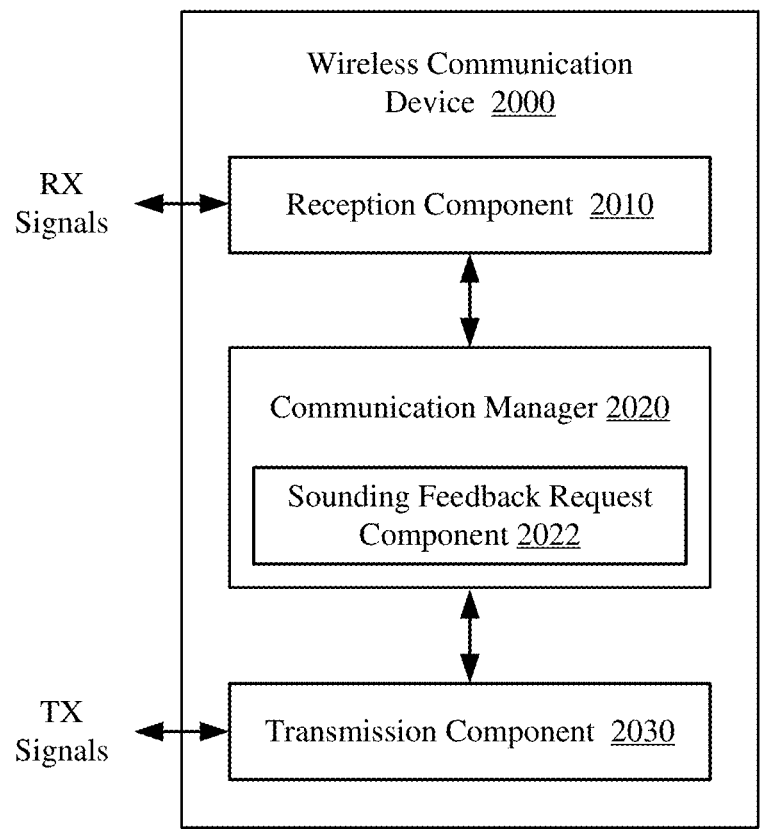
FIG. 20 shows a block diagram of an example wireless communication device according to some implementations.

FIG. 20 shows a block diagram of an example wireless communication device according to some implementations. In some implementations, the wireless communication device 2000 is configured to perform the process 1800 described above with reference to FIG. 17. In some implementations, the wireless communication device 2000 can be an example implementation of the wireless communication device 400 described above with reference to FIG. 4. For example, the wireless communication device 2000 can be a chip, SoC, chipset, package or device that includes at least one processor and at least one modem (for example, a Wi-Fi (IEEE 802.11) modem or a cellular modem).

The wireless communication device 2000 includes a reception component 2010, a communication manager 2020, and a transmission component 2030. The communication manager 2020 may further include a sounding feedback request component 2022. Portions of the sounding feedback request component 2022 may be implemented at least in part in hardware or firmware. In some implementations, the sounding feedback request component 2022 is implemented at least in part as software stored in a memory (such as the memory 408). For example, portions of the sounding feedback request component 2022 can be implemented as non-transitory instructions or code executable by a processor (such as the processor 406) to perform the functions or operations of the respective component.

The reception component 2010 is configured to receive RX signals from one or more other wireless communication devices and the transmission component 2030 is configured to transmit TX signals to one or more other wireless communication devices. The communication manager 2020 is configured to manage communications between the wireless communication device 2000 and one or more other wireless communication devices. In some implementations, the sounding feedback request component 2022 may transmit an NDPA frame indicating a request for sounding feedback, where the NDPA frame includes a MAC header, a sounding dialog token field that follows the MAC header, and a first STA information field carrying bandwidth information indicating a bandwidth associated with the sounding feedback, where the first two bits of the sounding dialogue token field indicate a format of the NDPA frame and the remaining bits of the sounding dialogue token field indicate a sounding dialog token number associated with the NDPA frame, and where the bandwidth information is associated with the format of the NDPA frame. In some implementations, the sounding feedback request component 2022 may further transmit an NDP following the transmission of the NDPA. In some implementations, the reception component 2010 may receive the sounding feedback responsive to the NDP.

Implementation examples are described in the following numbered clauses:

1. A method for wireless communication by a wireless communication device, including:
   receiving a null data packet announcement (NDPA) frame indicating a request for sounding feedback, the NDPA frame including a medium access control (MAC) header, a sounding dialog token field that follows the MAC header, and a first wireless station (STA) information field carrying bandwidth information indicating a bandwidth associated with the sounding feedback, the first two bits of the sounding dialogue token field indicating a format of the NDPA frame and the remaining bits of the sounding dialogue token field indicating a sounding dialog token number associated with the NDPA frame, the bandwidth information being associated with the format of the NDPA frame;
   receiving a null data packet (NDP) following the reception of the NDP; and
   transmitting the sounding feedback based on the received NDP and the bandwidth information.
2. The method of clause 1, where each of the first two bits of the sounding dialogue token field has a value equal to 1.
3. The method of any of clauses 1 or 2, where the bandwidth information is carried in a partial bandwidth information subfield that is less than 14 bits in length.
4. The method of any of clauses 1-3, where the first STA information field includes one or more reserved bits.
5. The method of any of clauses 1-4, where the first STA information field includes a number of columns (Nc) subfield that is 4 bits in length.
6. The method of any of clauses 1-5, where the Nc subfield indicates a number of spatial streams or a number of columns of a feedback matrix to be included in the sounding feedback.
7. The method of any of clauses 1-6, where the first STA information field includes an association identifier (AID) subfield having a special AID value that is not assigned to any STAs associated with the same basic service set (BSS) as the wireless communication device.
8. The method of any of clauses 1-7, where the first STA information field further includes a partial BSS identifier (BSSID) subfield having a value associated with the BSS and a number of STA information fields (NumSTAInfoFields) subfield indicating a number (N) of STA information fields following the first STA information field, each of the N STA information fields being identified based on a respective AID value and the value indicated by the partial BSSID subfield.
9. The method of any of clauses 1-8, where the NDP is a physical layer convergence protocol (PLCP) protocol data unit (PPDU) having a physical layer preamble that includes a legacy signal field (L-SIG), a repeat of L-SIG (RL-SIG) that follows L-SIG, and a universal signal field (U-SIG) that follows RL-SIG and carries information indicating that the PPDU is an NDP.
10. The method of any of clauses 1-9, where the information carried in U-SIG includes compression mode information indicating a compression mode associated with a multi-user (MU) PPDU format.
11. The method of any of clauses 1-10, where the physical layer preamble further includes a non-legacy signal field (EHT-SIG) that follows U-SIG, EHT-SIG including a common field and zero user fields.
12. The method of any of clauses 1-11, where the information carried in U-SIG includes a value of an EHT-SIG modulation and coding scheme (MCS) field indicating an MCS associated with EHT-SIG and includes a value of a number of EHT-SIG symbols field indicating a number of symbols associated with EHT-SIG.

13. The method of any of clauses 1-12, where the value of the EHT-SIG MCS field indicates MCS0 and the value of the number of EHT-SIG symbols field indicates 1 EHT-SIG symbol.

14. A wireless communication device including:
at least one processor; and
at least one memory communicatively coupled with the at least one processor and storing processor-readable code that, when executed by the at least one processor, is configured to perform the method of any one or more of clauses 1-13.

15. A method for wireless communication by a wireless communication device including:
transmitting a null data packet announcement (NDPA) frame indicating a request for sounding feedback, the NDPA frame including a medium access control (MAC) header, a sounding dialog token field that follows the MAC header, and a first wireless station (STA) information field carrying bandwidth information indicating a bandwidth associated with the sounding feedback, the first two bits of the sounding dialogue token field indicating a format of the NDPA frame and the remaining bits of the sounding dialogue token field indicating a sounding dialog token number associated with the NDPA frame, the bandwidth information being associated with the format of the NDPA frame;
transmitting a null data packet (NDP) following the transmission of the NDPA; and
receiving the sounding feedback responsive to the NDP.

16. The method of clause 15, where each of the first two bits of the sounding dialogue token field has a value equal to 1.

17. The method of any of clauses 15 or 16, where the bandwidth information is carried in a partial bandwidth information subfield that is less than 14 bits in length.

18. The method of any of clauses 15-17, where the first STA information field includes one or more reserved bits.

19. The method of any of clauses 15-18, where the first STA information field includes a number of columns (Nc) subfield that is 4 bits in length.

20. The method of any of clauses 15-19, where the Nc subfield indicates a number of spatial streams or a number of columns of a feedback matrix to be included in the sounding feedback.

21. The method of any of clauses 15-20, where the first STA information field includes an association identifier (AID) subfield having a special AID value that is not assigned to any STAs associated with the same basic service set (BSS) as the wireless communication device.

22. The method of any of clauses 15-21, where the first STA information field further includes a partial BSS identifier (BSSID) subfield having a value associated with the BSS and a number of STA information fields (NumSTAInfoFields) subfield indicating a number (N) of STA information fields following the first STA information field, each of the N STA information fields being identified based on a respective AID value and the value indicated by the partial BSSID subfield.

23. The method of any of clauses 15-22, where the NDP is a physical layer convergence protocol (PLCP) protocol data unit (PPDU) having a physical layer preamble that includes a legacy signal field (L-SIG), a repeat of L-SIG (RL-SIG) that follows L-SIG, and a universal signal field (U-SIG) that follows RL-SIG and carries information indicating that the PPDU is an NDP.

24. The method of any of clauses 15-23, where the information carried in U-SIG includes compression mode information indicating a compression mode associated with a multi-user (MU) PPDU format.

25. The method of any of clauses 15-24, where the physical layer preamble further includes a non-legacy signal field (EHT-SIG) that follows U-SIG, EHT-SIG including a common field and zero user fields.

26. The method of any of clauses 15-25, where the information carried in U-SIG includes a value of an EHT-SIG modulation and coding scheme (MCS) field indicating an MCS associated with EHT-SIG and includes a value of a number of EHT-SIG symbols field indicating a number of symbols associated with EHT-SIG.

27. The method of any of clauses 15-26, where the value of the EHT-SIG MCS field indicates MCS0 and the value of the number of EHT-SIG symbols field indicates 1 EHT-SIG symbol.

28. A wireless communication device including:
at least one processor; and
at least one memory communicatively coupled with the at least one processor and storing processor-readable code that, when executed by the at least one processor, is configured to perform the method of any of clauses 15-27.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device comprising:
   receiving a null data packet announcement (NDPA) frame indicating a request for sounding feedback, the NDPA frame including a medium access control (MAC) header, a sounding dialogue token field that follows the MAC header, and a first wireless station (STA) information field carrying bandwidth information indicating a bandwidth associated with the sounding feedback, a first two bits of the sounding dialogue token field indicating a format of the NDPA frame and remaining bits of the sounding dialogue token field indicating a sounding dialogue token number associated with the NDPA frame, the first STA information field including one or more reserved bits and an association identifier (AID) subfield value having a special AID value that is not assigned to any STAs associated with a same basic service set (BSS) as the wireless communication device, and the bandwidth information being associated with the format of the NDPA frame;
   receiving a null data packet (NDP) following the receiving of the NDPA, wherein the NDP is a physical layer convergence protocol (PLCP) protocol data unit (PPDU) having a physical layer preamble that includes a legacy signal field (L-SIG), a repeat of the L-SIG (RL-SIG) that follows the L-SIG, and a universal signal field (U-SIG) that follows the RL-SIG, and wherein the U-SIG carries information indicating that the PPDU is an NDP; and
   transmitting the sounding feedback in accordance with the received NDP and the bandwidth information.

2. The method of claim 1, wherein each of the first two bits of the sounding dialogue token field has a value equal to 1.

3. The method of claim 1, wherein the first STA information field further includes a partial BSS identifier (BSSID) subfield having a value associated with the BSS and a number of STA information fields (NumSTAInfoFields) subfield indicating a number (N) of STA information fields following the first STA information field, each of the N STA information fields being identified in accordance with a respective AID value and the value indicated by the partial BSSID subfield.

4. The method of claim 1, wherein the information carried in the U-SIG includes compression mode information indicating a compression mode associated with a multi-user (MU) PPDU format.

5. The method of claim 1, wherein the physical layer preamble further includes a non-legacy signal field (EHT-SIG) that follows the U-SIG, the EHT-SIG including a common field and zero user fields.

6. The method of claim 2, wherein the bandwidth information is carried in a partial bandwidth information subfield that is less than 14 bits in length.

7. The method of claim 2, wherein the first STA information field includes a number of columns (Nc) subfield that is 4 bits in length.

8. The method of claim 5, wherein the information carried in the U-SIG includes a value of an EHT-SIG modulation and coding scheme (MCS) field indicating an MCS associated with the EHT-SIG and includes a value of a number of EHT-SIG symbols field indicating a number of symbols associated with the EHT-SIG.

9. The method of claim 7, wherein the Nc subfield indicates a number of spatial streams or a number of columns of a feedback matrix to be included in the sounding feedback.

10. The method of claim 8, wherein the value of the EHT-SIG MCS field indicates MCS0 and the value of the number of EHT-SIG symbols field indicates 1 EHT-SIG symbol.

11. An apparatus at a wireless communication device for wireless communications, comprising:
   a processing system that includes one or more processors and one or more memories coupled with the one or more processors, the processing system configured to cause the apparatus to:
      receive a null data packet announcement (NDPA) frame indicating a request for sounding feedback, the NDPA frame including a medium access control (MAC) header, a sounding dialogue token field that follows the MAC header, and a first wireless station (STA) information field carrying bandwidth information indicating a bandwidth associated with the sounding feedback, a first two bits of the sounding dialogue token field indicating a format of the NDPA frame and remaining bits of the sounding dialogue token field indicating a sounding dialogue token number associated with the NDPA frame, the first STA information field including one or more reserved bits and an association identifier (AID) subfield value having a special AID value that is not assigned to any STAs associated with a same basic service set (BSS) as the wireless communication device, and the bandwidth information being associated with the format of the NDPA frame;
      receive a null data packet (NDP) following the receiving of the NDPA, wherein the NDP is a physical layer convergence protocol (PLCP) protocol data unit (PPDU) having a physical layer preamble that includes a legacy signal field (L-SIG), a repeat of the L-SIG (RL-SIG) that follows the L-SIG, and a universal signal field (U-SIG) that follows the RL-SIG, and wherein the U-SIG carries information indicating that the PPDU is an NDP; and
      transmit the sounding feedback in accordance with the received NDP and the bandwidth information.

12. The apparatus of claim 11, wherein each of the first two bits of the sounding dialogue token field has a value equal to 1.

13. A method for wireless communication by a wireless communication device comprising:
 transmitting a null data packet announcement (NDPA) frame indicating a request for sounding feedback, the NDPA frame including a medium access control (MAC) header, a sounding dialogue token field that follows the MAC header, and a first wireless station (STA) information field carrying bandwidth information indicating a bandwidth associated with the sounding feedback, a first two bits of the sounding dialogue token field indicating a format of the NDPA frame and remaining bits of the sounding dialogue token field indicating a sounding dialogue token number associated with the NDPA frame, the first STA information field including one or more reserved bits and an association identifier (AID) subfield value having a special AID value that is not assigned to any STAs associated with a same basic service set (BSS) as the wireless communication device, and the bandwidth information being associated with the format of the NDPA frame;
 transmitting a null data packet (NDP) following the transmitting of the NDPA, wherein the NDP is a physical layer convergence protocol (PLCP) protocol data unit (PPDU) having a physical layer preamble that includes a legacy signal field (L-SIG), a repeat of the L-SIG (RL-SIG) that follows the L-SIG, and a universal signal field (U-SIG) that follows the RL- SIG, and wherein the U-SIG carries information indicating that the PPDU is an NDP; and
 receiving the sounding feedback responsive to the NDP.

14. The method of claim 13, wherein each of the first two bits of the sounding dialogue token field has a value equal to 1.

15. The method of claim 13, wherein the first STA information field further includes a partial BSS identifier (BSSID) subfield having a value associated with the BSS and a number of STA information fields (NumSTAInfoFields) subfield indicating a number (N) of STA information fields following the first STA information field, each of the N STA information fields being identified in accordance with a respective AID value and the value indicated by the partial BSSID subfield.

16. The method of claim 13, wherein the information carried in the U-SIG includes compression mode information indicating a compression mode associated with a multi-user (MU) PPDU format.

17. The method of claim 13, wherein the physical layer preamble further includes a non-legacy signal field (EHT-SIG) that follows the U-SIG, the EHT-SIG including a common field and zero user fields.

18. The method of claim 14, wherein the bandwidth information is carried in a partial bandwidth information subfield that is less than 14 bits in length.

19. The method of claim 14, wherein the first STA information field includes a number of columns (Nc) subfield that is 4 bits in length.

20. The method of claim 17, wherein the information carried in the U-SIG includes a value of an EHT-SIG modulation and coding scheme (MCS) field indicating an MCS associated with the EHT-SIG and includes a value of a number of EHT-SIG symbols field indicating a number of symbols associated with the EHT-SIG.

21. The method of claim 20, wherein the Nc subfield indicates a number of spatial streams or a number of columns of a feedback matrix to be included in the sounding feedback.

22. The method of claim 20, wherein the value of the EHT-SIG MCS field indicates MCS0 and the value of the number of EHT-SIG symbols field indicates 1 EHT-SIG symbol.

23. An apparatus at a wireless communication device for wireless communications, comprising:
 a processing system that includes one or more processors and one or more memories coupled with the one or more processors, the processing system configured to cause the apparatus to:
  transmit a null data packet announcement (NDPA) frame indicating a request for sounding feedback, the NDPA frame including a medium access control (MAC) header, a sounding dialogue token field that follows the MAC header, and a first wireless station (STA) information field carrying bandwidth information indicating a bandwidth associated with the sounding feedback, a first two bits of the sounding dialogue token field indicating a format of the NDPA frame and remaining bits of the sounding dialogue token field indicating a sounding dialogue token number associated with the NDPA frame, the first STA information field including one or more reserved bits and an association identifier (AID) subfield value having a special AID value that is not assigned to any STAs associated with a same basic service set (BSS) as the wireless communication device, and the bandwidth information being associated with the format of the NDPA frame;
  transmit a null data packet (NDP) following the transmitting of the NDPA, wherein the NDP is a physical layer convergence protocol (PLCP) protocol data unit (PPDU) having a physical layer preamble that includes a legacy signal field (L-SIG), a repeat of the L-SIG (RL-SIG) that follows the L-SIG, and a universal signal field (U-SIG) that follows the RL-SIG, and wherein the U-SIG carries information indicating that the PPDU is an NDP; and
  receive the sounding feedback responsive to the NDP.

24. The apparatus of claim 23, wherein each of the first two bits of the sounding dialogue token field has a value equal to 1.

* * * * *